(12) United States Patent
Purkayastha et al.

(10) Patent No.: US 10,952,458 B2
(45) Date of Patent: Mar. 23, 2021

(54) STEVIA EXTRACT CONTAINING SELECTED STEVIOL GLYCOSIDES AS FLAVOR, SALTY AND SWEETNESS PROFILE MODIFIER

(71) Applicant: PureCircle USA Inc., Oak Brook, IL (US)

(72) Inventors: Siddhartha Purkayastha, Chicago, IL (US); Marcia Petit, Chicago, IL (US); Karen Grenus, Aurora, IL (US)

(73) Assignee: PURECIRCLE USA INC, Chicago, IL (US)

( * ) Notice: Subject to any disclaimer, the term of this patent is extended or adjusted under 35 U.S.C. 154(b) by 0 days.

(21) Appl. No.: 15/619,107

(22) Filed: Jun. 9, 2017

(65) Prior Publication Data

US 2017/0339994 A1    Nov. 30, 2017

Related U.S. Application Data

(63) Continuation-in-part of application No. 14/896,022, filed as application No. PCT/US2014/041548 on Jun. 9, 2014.

(60) Provisional application No. 61/832,451, filed on Jun. 7, 2013, provisional application No. 61/942,331, filed on Feb. 20, 2014.

(51) Int. Cl.
| | |
|---|---|
| *A23L 27/30* | (2016.01) |
| *A23L 27/00* | (2016.01) |
| *A23L 33/105* | (2016.01) |
| *A23L 2/60* | (2006.01) |

(52) U.S. Cl.
CPC ............ *A23L 27/36* (2016.08); *A23L 2/60* (2013.01); *A23L 27/86* (2016.08); *A23L 27/88* (2016.08); *A23L 33/105* (2016.08); *A23V 2002/00* (2013.01)

(58) Field of Classification Search
CPC . A23L 27/36; A23L 27/88; A23L 2/60; A23L 33/105; A23L 27/86; A23V 2002/00
See application file for complete search history.

(56) References Cited

U.S. PATENT DOCUMENTS

| | | |
|---|---|---|
| 2,500,173 A | 3/1950 | Gisvold |
| 2,615,015 A | 10/1952 | Wilson |
| 3,723,410 A | 3/1973 | Persinos |
| 4,082,858 A | 4/1978 | Morita |
| 4,112,218 A | 9/1978 | Inoue |
| 4,171,430 A | 10/1979 | Matsushita |
| 4,219,571 A | 8/1980 | Miyake |
| 4,361,697 A | 11/1982 | Dobberstein |
| 4,454,290 A | 6/1984 | Dubois |
| 4,590,160 A | 5/1986 | Nishihashi |
| 4,599,403 A | 7/1986 | Kumar |
| 4,612,942 A † | 9/1986 | Dobberstein |
| 4,657,638 A | 4/1987 | le Grand |
| 4,892,938 A | 1/1990 | Giovanetto |
| 4,915,969 A | 4/1990 | Beyts |
| 4,917,916 A | 4/1990 | Hirao |
| 5,112,610 A | 5/1992 | Kienle |
| 5,576,042 A | 11/1996 | Fuisz |
| 5,779,805 A | 7/1998 | Morano |
| 5,830,523 A | 11/1998 | Takaichi |
| 5,962,678 A | 10/1999 | Payzant |
| 5,972,120 A | 10/1999 | Kutowy |
| 6,031,157 A | 2/2000 | Morita |
| 6,080,561 A | 6/2000 | Morita |
| 6,204,377 B1 | 3/2001 | Nishimoto |
| 6,228,996 B1 | 5/2001 | Zhou |
| 6,318,157 B1 | 11/2001 | Corso |
| 6,706,304 B1 | 3/2004 | Ishida |
| 7,807,206 B2 | 10/2010 | Magomet |
| 7,838,011 B2 | 11/2010 | Abelyan |
| 7,862,845 B2 | 1/2011 | Magomet |
| 8,030,481 B2 | 10/2011 | Prakash |
| 8,257,948 B1 | 9/2012 | Markosyan |
| 8,318,459 B2 | 11/2012 | Markosyan |
| 8,647,844 B2 | 2/2014 | Markosyan |
| 8,669,077 B2 | 3/2014 | Markosyan |
| 8,735,101 B2 | 5/2014 | Markosyan |
| 8,911,971 B2 | 12/2014 | Markosyan |
| 8,993,269 B2 | 3/2015 | Markosyan |
| 9,055,761 B2 | 6/2015 | Markosyan |
| 9,107,436 B2 | 8/2015 | Purkayastha et al. |
| 2002/1322320 | 9/2002 | Wang |
| 2002/0187232 A1 | 12/2002 | Lee |
| 2002/0197371 A1 | 12/2002 | Lee |

(Continued)

FOREIGN PATENT DOCUMENTS

| | | |
|---|---|---|
| CN | 1049666 | 3/1991 |
| CN | 1100727 | 3/1995 |

(Continued)

OTHER PUBLICATIONS

CN-101062077-A English translation (Year: 2007).*
Harman et al., "Sensory Testing for Flavorings with Modifying Properties", Nov. 2013, vol. 67, No. 11, 15 pages.
A-Glucosyltransferase Treated Stevia, Japan's Specifications and Standards for Food Additives, VIII edition, 2009, p. 257.
Bae S. et al.; "Manufacturing enzymatically modified Stevia for use in food and drink e.g. alcoholic beverage and for use as sweetening agent, flavor enhancer and reagent, involves adding cyclodextrin glucosyltransferase and Stevia extract in solvent", WPI/Thomson, vol. 2009, No. 60, Mar. 16, 2009, XP002729278.
Ahmed, et al., "Use of p-Bromophenacyl Bromide to Enhance Ultraviolet Detection of Water-Soluble Organic Acids (Steviolbioside and Rebaudioside B) in High-Performance Liquid Chromatographic Analysis", Journal of Chromatography, vol. 192, 1980, 387-393.

(Continued)

*Primary Examiner* — Sarah Pihonak

(57) ABSTRACT

Stevia extracts with selected major steviol glycosides (Reb A, stevioside, Reb D, Reb C) and minor steviol glycosides and glycosylated diterpene derivative plant molecules, derived from *Stevia rebaudiana* plant are found to improve the perception of flavor and taste perception, which includes the sweet, savory and salty perception in a wide range of food and beverage applications.

5 Claims, 9 Drawing Sheets

(56) References Cited

U.S. PATENT DOCUMENTS

| | | |
|---|---|---|
| 2003/0161876 A1 | 8/2003 | Hansson |
| 2003/0232118 A1 | 12/2003 | Lerchenfeld |
| 2003/0236399 A1 | 12/2003 | Zheng |
| 2004/0146468 A1* | 7/2004 | Daniel ............... A61K 8/97 424/58 |
| 2006/0083838 A1 | 4/2006 | Jackson |
| 2006/0134292 A1 | 6/2006 | Abelyan |
| 2006/0142555 A1 | 6/2006 | Jonnala |
| 2007/0082102 A1 | 4/2007 | Magomet |
| 2007/0082103 A1 | 4/2007 | Magomet |
| 2007/0082106 A1 | 4/2007 | Lee |
| 2007/0116800 A1 | 5/2007 | Prakash |
| 2007/0116819 A1 | 5/2007 | Prakash |
| 2007/0116820 A1 | 5/2007 | Prakash |
| 2007/0116821 A1 | 5/2007 | Prakash |
| 2007/0116822 A1 | 5/2007 | Prakash |
| 2007/0116823 A1 | 5/2007 | Prakash |
| 2007/0116824 A1 | 5/2007 | Prakash |
| 2007/0116825 A1 | 5/2007 | Prakash |
| 2007/0116826 A1 | 5/2007 | Prakash |
| 2007/0116827 A1 | 5/2007 | Prakash |
| 2007/0116828 A1 | 5/2007 | Prakash |
| 2007/0116829 A1 | 5/2007 | Prakash |
| 2007/0116830 A1 | 5/2007 | Prakash |
| 2007/0116831 A1 | 5/2007 | Prakash |
| 2007/0116832 A1 | 5/2007 | Prakash |
| 2007/0116833 A1 | 5/2007 | Prakash |
| 2007/0116834 A1 | 5/2007 | Prakash |
| 2007/0116835 A1 | 5/2007 | Prakash |
| 2007/0116836 A1 | 5/2007 | Prakash |
| 2007/0116837 A1 | 5/2007 | Prakash |
| 2007/0116838 A1 | 5/2007 | Prakash |
| 2007/0116839 A1 | 5/2007 | Prakash |
| 2007/0116840 A1 | 5/2007 | Prakash |
| 2007/0116841 A1 | 5/2007 | Prakash |
| 2007/0128311 A1 | 6/2007 | Prakash |
| 2007/0134390 A1 | 6/2007 | Prakash |
| 2007/0134391 A1 | 6/2007 | Prakash |
| 2007/0224321 A1 | 9/2007 | Prakash |
| 2007/0292582 A1 | 12/2007 | Prakash |
| 2008/0064063 A1 | 3/2008 | Brandle |
| 2008/0102497 A1 | 5/2008 | Wong |
| 2008/0107775 A1 | 5/2008 | Prakash |
| 2008/0107776 A1 | 5/2008 | Prakash |
| 2008/0107787 A1 | 5/2008 | Prakash |
| 2008/0108710 A1 | 5/2008 | Prakash |
| 2008/0111269 A1 | 5/2008 | Politi |
| 2008/0226770 A1 | 9/2008 | Lee |
| 2008/0226797 A1 | 9/2008 | Lee |
| 2008/0292764 A1 | 11/2008 | Prakash |
| 2008/0292765 A1 | 11/2008 | Prakash |
| 2008/0292775 A1 | 11/2008 | Prakash |
| 2008/0300402 A1 | 12/2008 | Yang |
| 2009/0017185 A1 | 1/2009 | Catani |
| 2009/0053378 A1 | 2/2009 | Prakash |
| 2009/0074935 A1 | 3/2009 | Lee |
| 2009/0079935 A1 | 3/2009 | Harris |
| 2009/0104330 A1 | 4/2009 | Zasypkin |
| 2009/0142817 A1 | 6/2009 | Norman |
| 2009/0162484 A1† | 6/2009 | Bell |
| 2009/0162499 A1 | 6/2009 | McArdle |
| 2009/0226590 A1 | 9/2009 | Fouache |
| 2009/0324793 A1 | 12/2009 | Shuwang |
| 2010/0055752 A1 | 3/2010 | Kumar |
| 2010/0056472 A1 | 3/2010 | Duan |
| 2010/0099857 A1 | 4/2010 | Evans |
| 2010/0011215 A1 | 5/2010 | Abelyan |
| 2010/0057024 A1 | 5/2010 | Cavallini |
| 2010/0120710 A1 | 5/2010 | Watanabe |
| 2010/0013756 A1 | 6/2010 | Prakash et al. |
| 2010/0137569 A1 | 6/2010 | Prakash |
| 2010/0018986 A1 | 7/2010 | Abelyan et al. |
| 2010/0166679 A1 | 7/2010 | Abelyan |
| 2010/0189861 A1 | 7/2010 | Abelyan |
| 2010/0227034 A1 | 9/2010 | Purkayastha |
| 2010/0255171 A1 | 10/2010 | Purkayastha |
| 2010/0278993 A1 | 11/2010 | Prakash |
| 2010/0316782 A1 | 12/2010 | Shi |
| 2011/0030457 A1 | 2/2011 | Valery |
| 2011/0033525 A1 | 2/2011 | Lui |
| 2011/0092684 A1 | 4/2011 | Abelyan |
| 2011/0104353 A1 | 5/2011 | Lee |
| 2011/0111115 A1 | 5/2011 | Shi |
| 2011/0124587 A1 | 5/2011 | Jackson |
| 2011/0163011 A1 | 6/2011 | Prakash |
| 2011/0183056 A1 | 7/2011 | Morita |
| 2011/0189360 A1 | 8/2011 | Yoo |
| 2011/0195169 A1 | 8/2011 | Markosyan |
| 2011/0224168 A1 | 9/2011 | Szente |
| 2012/0157553 A1 | 6/2012 | Dewis |
| 2012/0164678 A1 | 6/2012 | Stephanopoulos |
| 2012/0214751 A1 | 8/2012 | Markosyan |
| 2012/0214752 A1 | 8/2012 | Markosyan |
| 2012/0301589 A1 | 11/2012 | Markosyan |
| 2013/0030060 A1 | 1/2013 | Markosyan |
| 2013/0064955 A1 | 3/2013 | Miquel et al. |
| 2013/0071339 A1 | 3/2013 | Markosyan |
| 2013/0347140 A1 | 12/2013 | Wang |
| 2014/0017378 A1 | 1/2014 | Purkayastha et al. |
| 2014/0171519 A1 | 6/2014 | Prakash et al. |
| 2014/0271996 A1 | 9/2014 | Prakash |
| 2014/0357588 A1 | 12/2014 | Markosyan |
| 2015/0031868 A1 | 1/2015 | Lehmann |
| 2015/0141632 A1 | 5/2015 | Markosyan |
| 2015/0157045 A1 | 6/2015 | Markosyan |
| 2015/0257424 A1 | 9/2015 | Catani et al. |
| 2017/0190728 A1 | 7/2017 | Markosyan |
| 2018/0079767 A1 | 3/2018 | Markosyan et al. |

FOREIGN PATENT DOCUMENTS

| | | | |
|---|---|---|---|
| CN | 1112565 | | 11/1995 |
| CN | 1192447 | | 9/1998 |
| CN | 1238341 | | 5/2002 |
| CN | 1349997 | | 5/2002 |
| CN | 101062077 A | * | 10/2007 |
| CN | 101200480 | | 6/2008 |
| CN | 101591365 | | 12/2009 |
| CN | 101628924 | | 1/2010 |
| EP | 0957178 | | 4/1999 |
| EP | 2433505 | | 3/2012 |
| EP | 2510800 | | 10/2012 |
| GB | 2027423 | | 2/1980 |
| JP | 52005800 | | 1/1977 |
| JP | 52083731 | | 7/1977 |
| JP | 52100500 | | 8/1977 |
| JP | 52136200 | | 11/1977 |
| JP | 54030199 | | 3/1979 |
| JP | 54132599 | | 10/1979 |
| JP | 55039731 | | 3/1980 |
| JP | 55081567 | | 6/1980 |
| JP | 55092400 | | 7/1980 |
| JP | 55120770 | | 9/1980 |
| JP | 55138372 | | 10/1980 |
| JP | 55159770 | | 12/1980 |
| JP | 55162953 | | 12/1980 |
| JP | 56099768 | | 8/1981 |
| JP | 56109568 | | 8/1981 |
| JP | 56121453 | | 9/1981 |
| JP | 56121454 | | 9/1981 |
| JP | 56121455 | | 9/1981 |
| JP | 56160962 | | 12/1981 |
| JP | 57002656 | | 1/1982 |
| JP | 57005663 | | 1/1982 |
| JP | 57046998 | | 3/1982 |
| JP | 57075992 | | 5/1982 |
| JP | 57086264 | | 5/1982 |
| JP | 58020170 | | 2/1983 |
| JP | 58028246 | | 2/1983 |
| JP | 58028247 | | 2/1983 |
| JP | S5878562 | | 5/1983 |
| JP | 58212759 | | 12/1983 |
| JP | 58212760 | | 12/1983 |
| JP | 59045848 | | 3/1984 |

(56) References Cited

FOREIGN PATENT DOCUMENTS

| | | |
|---|---|---|
| JP | S5948059 | 3/1984 |
| JP | 59183670 | 10/1984 |
| JP | S6037950 | 2/1985 |
| JP | 60188035 | 9/1985 |
| JP | 62166861 | 7/1987 |
| JP | 63173531 | 7/1988 |
| JP | 1131191 | 5/1989 |
| JP | H0383558 | 4/1991 |
| JP | 3262458 | 11/1991 |
| JP | 6007108 | 1/1994 |
| JP | 6192283 | 7/1994 |
| JP | 7143860 | 6/1995 |
| JP | 7177862 | 7/1995 |
| JP | 8000214 | 1/1996 |
| JP | 9107913 | 4/1997 |
| JP | 2000236842 | 9/2000 |
| JP | 2000270804 | 10/2000 |
| JP | 2002262822 | 9/2002 |
| JP | 2010516764 | 5/2010 |
| KR | 20070067199 | 6/2007 |
| KR | 20080071605 | 8/2008 |
| KR | 20090021386 | 3/2009 |
| RU | 2111969 | 5/1998 |
| RU | 2123267 | 12/1998 |
| RU | 2156083 | 9/2000 |
| RU | 2167544 | 5/2001 |
| RU | 2198548 | 2/2003 |
| WO | WO2002087359 | 11/2002 |
| WO | WO2005089483 | 9/2005 |
| WO | WO2006072878 | 7/2006 |
| WO | WO2006072879 | 7/2006 |
| WO | WO2007061795 | 5/2007 |
| WO | WO2007116823 | 5/2007 |
| WO | WO2008091547 | 7/2008 |
| WO | WO2008112966 | 9/2008 |
| WO | WO2009071277 | 6/2009 |
| WO | WO2009108680 | 9/2009 |
| WO | WO2009140394 | 11/2009 |
| WO | WO2010038911 | 4/2010 |
| WO | WO2010118218 | 10/2010 |
| WO | WO2010146463 | 12/2010 |
| WO | WO2011046423 | 4/2011 |
| WO | WO2011059954 | 5/2011 |
| WO | WO2011097359 | 8/2011 |
| WO | 2011112892 A1 | 9/2011 |
| WO | WO2011112892 | 9/2011 |
| WO | WO2011153378 | 12/2011 |
| WO | WO2012006728 | 1/2012 |
| WO | 2012073121 A2 | 6/2012 |
| WO | WO2012082493 | 6/2012 |
| WO | WO2012082677 | 6/2012 |
| WO | WO2012088593 | 7/2012 |
| WO | WO2012102769 | 8/2012 |
| WO | WO2012112180 | 8/2012 |
| WO | 2012129451 A1 | 9/2012 |
| WO | WO2012125991 | 9/2012 |
| WO | WO2012129451 | 9/2012 |
| WO | 2012177727 A1 | 12/2012 |
| WO | WO2012166163 | 12/2012 |
| WO | WO2012166164 | 12/2012 |
| WO | WO2012177727 | 12/2012 |
| WO | WO2013022989 | 2/2013 |
| WO | WO2014122328 | 2/2013 |
| WO | WO2013096420 | 6/2013 |
| WO | WO2013110673 | 8/2013 |
| WO | WO2013176738 | 11/2013 |
| WO | WO2014086890 | 6/2014 |
| WO | WO2014122227 | 8/2014 |
| WO | WO2014146089 | 9/2014 |
| WO | WO2014146135 | 9/2014 |
| WO | WO2014193888 | 12/2014 |
| WO | WO2014197898 | 12/2014 |
| WO | WO2015023928 | 2/2015 |
| WO | WO2015152707 | 10/2015 |
| WO | WO2016023103 | 2/2016 |
| WO | WO2016034942 | 3/2016 |
| WO | WO2016049531 | 3/2016 |
| WO | WO2016100689 | 6/2016 |
| WO | WO2016143361 | 9/2016 |
| WO | WO2016187559 | 11/2016 |
| WO | WO2017031301 | 2/2017 |
| WO | WO2017059414 | 4/2017 |
| WO | WO2012088612 | 7/2017 |
| WO | WO2017160846 | 9/2017 |

OTHER PUBLICATIONS

Chang, S. S. et al., "Stability Studies of Stevioside and Rebaudioside A in Carbonated Beverages", Journal of Agricultural and Food Chemistry, vol. 31, 1983, 409-412.

Chen, et al., "Enrichment and separation of rebaudioside A from stevia glycosides by a novel adsorbent with pyridyl group", Science in China, vol. 42, No. 3 1999, 277-282.

Chen, et al., "Selectivity of polymer adsorbent in adsorptive separations of stevia diterpene glycisides", Science in China, vol. 41, No. 4 1998 436-441.

Chen, et al., "Studies on the adsorptive selectivity of the polar resin with carbonyl group on rebaudioside A", Acta Polymeric Scnica, No. 4 1999, 398-403.

Crammer, et al., "Sweet glycosides from the Stevia plant", Chemistry in Britain, Oct. 1986, 915-916, 918.

Chatsudthipong, et al. Stevioside and related compounds: Therapeutic benefits beyond sweetness, pp. 41-45 Pharmacology & Therapeutics 121 (2009).

Darise et al., "Enzymic Transglucosylation of Rubusoside and the Structure-Sweetness Relationship of Steviol Bisglycosides," Agric. Biol. Chem. vol. 48(10), 1984, 2483-2488.

Dubois et al., "Diterpenoid Sweeteners. Synthesis and Sensory Evaluation of Stevioside Analogues with Improved Organoleptic Properties," J. Med. Chem. vol. 28, (1985) 93-98.

Espinoza et al., "Identification, Quantification, and Sensory Characterization of Steviol Glycosides from Differently Processed Stevia rebaudiana Commercial Extracts", Agric. Food Chem. 2014 62, 11797-11804.

Fao/Who "Combined Compendium of Food Additive Specifications" Fao JECFA Monographs 1, vol. 4, 2006, Food and Agricultural Organization of the United Nations, Rome.

Fuh, "Purification of steviosides by membrane and ion exchange process", Journal of Food Science, vol. 55, No. 5 1990, 1454-1457.

Fukunaga et al., "Enzymic Transglucosylation Products of Stevioside: Separation and Sweetness-evaluation," Agric. Biol. Chem. vol. 53(6) (1989) 1603-1607.

Fullas et al., "Separation of natural product sweetening agents using overpressured layer chromatography," Journal of Chromatography vol. 464 (1989) 213-219.

Hale, et al., "Amylase of Bacillus Macerans", Cereal Chemistry, vol. 28, No. 1, Jan. 1951, 49-58.

Ibrahim et al., "Minor Diterpene Glycosides from the Leaves of Stevia Rebaudiana", J. Nat. Prod., 2014, 77, 1231-1235.

International Search Report and Written Opinion of PCT/US2010/055960 dated 2011.

International Search Report and Written Opinion of PCT/US2011/028028 dated 2011.

International Search Report and Written Opinion of PCT/US2011/033734 dated 2011.

International Search Report and Written Opinion of PCT/US2011/033737 dated 2011.

International Search Report and Written Opinion of PCT/US2011/033912 dated 2011.

International Search Report and Written Opinion of PCT/US2011/035173 dated 2011.

International Search Report and Written Opinion of PCT/US2011/036063 dated 2011.

International Search Report and Written Opinion of PCT/US2011/047498 dated 2011.

International Search Report and Written Opinion of PCT/US2011/047499 dated 2011.

(56) References Cited

OTHER PUBLICATIONS

International Search Report and Written Opinion of PCT/US2011/064343 dated 2013.
International Search Report and Written Opinion of PCT/US2012/024585 dated 2012.
International Search Report and Written Opinion of PCT/US2012/024722 dated 2012.
International Search Report and Written Opinion of PCT/US2012/030210 dated 2012.
International Search Report and Written Opinion of PCT/US2012/043294 dated 2012.
International Search Report and Written Opinion of PCT/US2012/051163 dated 2012.
International Search Report and Written Opinion of PCT/US2012/052659 dated 2012.
International Search Report and Written Opinion of PCT/US2012/052665 dated 2012.
International Search Report and Written Opinion of PCT/US2013/030439 dated 2013.
International Search Report and Written Opinion of PCT/US2014/041548 dated 2014.
International Search Report and Written Opinion of PCT/US2014/056451 dated 2015.
International Search Report and Written Opinion of PCT/US2016/058834 dated 2016.
International Search Report and Written Opinion of PCT/US2016/067053 dated 2017.
International Search Report and Written Opinion of PCT/US2015/047234 dated 2015.
International Search Report and Written Opinion of PCT/US2018/053258 dated 2018.
Gorden et al. ("Supersaturation" Access Science McGraw Hill 2008, p. 1, http://www.accessscience.com/content/supersaturation/670000).
Hartel, Richard "Crystallization in Foods" Handbook of Industrial Crystallization Elsevier 2002, pp. 287 and 293-296.
"Recrystallization Technique: Proper purification of crystalline solids". Available online as of Dec. 4, 2009 from www.erowid.org. pp. 1-3.
Huang, X Y, et al. "Preparative isolation and purification of steviol glycosides from Stevia rebaudiana Bertoni using high-speed counter-current chromatogoraphy" Separation and Purification Technology Elsevier Science, Netherlands, vol. 71, No. 2, 2010, p. 220-224.
Jaitak, et al., "An Efficient Microwave-assisted Extraction Process of Stevioside and Rebaudioside-A from Stevia Rebaudiana (Bertoni)", Phytochem. Anal. vol. 20 2009, 240-245.
Kennelly, "Sweet and non-sweet constituents of Stevia rebaudiana", Stevia: The genus *Stevia*, Taylor & Francis, 2002, 68-85.
Kinghorn, "Overview", Stevia: The genus *Stevia*, Taylor & Francis, 2002, 1-17.
Kitahata, S. et al., "Production of Rubusoside Derivatives by Transgalactosylation of Various b-Galactosidases" Agric. Biol. Chem., vol. 53, No. 11 1989, 2923-2928.
Kobayashi, et al., "Dulcoside A and B, New diterpene glycosides from Stevia Rebaudiana", Phytochemistry, vol. 16 1977, 1405-1408.
Kochikyan, et al., "Combined Enzymatic Modification of Stevioside and Rebaudioside A", Applied Biochemistry and Microbiology, vol. 42, No. 1, 2006, 31-37.
Kohda, et al., "New sweet diterpene glucosides from Stevia Rebaudiana", Phytochemistry, vol. 15 1976, 981-983.
Kovylyaeva, et al., "Glycosides from Stevia rebaudiana", Chemistry of Natural Compounds, vol. 43, No. 1 2007, 81-85.
Li, Sha et al.; "Transglycosylation of stevioside to improve the edulcorant quality by lower substitution using cornstarch hydrolysate and CGTase", Food Chemistry, vol. 138, No. 2, Nov. 12, 2012, pp. 2064-2069, XP028977479, ISSN: 0308-8146, DOI: 10.1016/J.FOODCHEM.2012.10.124.
Liu, et al., "Study of stevioside preparation by membrane separation process", Desalination, vol. 83 1991, 375-382.
Lobov, S. V. et al., "Enzymic Production of Sweet Stevioside Derivatives: Transglucosylation of Glucosidases", Agric. Biol. Chem., vol. 55, No. 12 1991, 2959-2965.
Montovaneli, et al., "The effect of temperature and flow rate on the clarification of the aqueous Stevia-extract in fixed-bed column with zeolites", Brazilian Journal of Chemical Engineering, vol. 21, No. 3 2004, 449-458.
Moraes, et al., "Clarification of Stevia rebaudiana (Bert.) Bertoni extract adsorption in modified zeolites", Acta Scientiarum, vol. 23, No. 6 2001, 1375-1380.
News Bites, GLG announces high purity REB M GRAS notification with FDA. Consumer Durables & Apparel Melbourne. Apr. 15, 2014. pp. 1-2. especially, p. 1, para 5; p. 2, para 1.
Ohio "14.0 Spray Drying and Spray Dryers", pp. 1-10, http://class.fst.ohio-state-edu/Dairy_Tech/14Spraydrying.htm Nov. 2, 2009 as obtained by internetarchive.org.
Ohta et al., "Characterization of Novel Steviol Glycosides from Leaves of Stevia rebaudiana Morita," J. Appl. Glycosi., vol. 57, 199-209, 2010.
Ohtani et al. "Chapter 7. Methods to improve the taste of the sweet principles of Stevia rebaudiana." The Genus *Stevia*, edited by A. Douglas Kinghorn, CRC Press 2001, Taylor and Francis, London and New York, pp. 138-159.
Philips, K.C. "Stevia: steps in developing a new sweetener", In T.H. Grenby, Editor, Developments in Sweeteners-3, Elsevier 1987, 1-43.
Pol, et al., "Comparison of two different solvents employed for pressurised fluid extraction of stevioside from Stevia rebaudiana: methanol versus water", Anal Bioanal Chem vol. 388 2007, 1847-1857.
Pol, et al., "Characterisation of Stevia Rebaudiana by comprehensive two-dimensional liquid chromatography time-of-flight mass spectrometry," Journal of Chromatography A, 1150 (2007) 85-92.
Prakash et al., "Development of rebiana, a natural, non-caloric sweetener," Jul. 1, 2008, Food and Chemical Toxology, vol. 46, Is. 7, Sup. 1, p. S75-S82.
Prakash et al. "Isolation and Characterization of a Novel Rebaudioside M Isomer from a Bioconversion Reaction of Rebaudioside A and NMR Comparison Studies of Rebaudioside M Isolated from Stevia rebaudiana Bertoni and Stevia rebaudiana Morita," Biomolecules, vol. 4, 2014, 374-389, p. 385 para 5.
Prakash et al., "Development of Next Generation Stevia Sweetener: Rebaudioside M" Foods 2014, 3, 162-175, ISSN 2304-8158.
Ramirez, I.; "Glucose polymer taste is not unitary for rats", Physiology & Behaviour, 1994, 55(2), pp. 355-360 (Abstract only).
Rebaudioside A and Stevia Extract, Internet Citation, 2007 http://emperorsherbologist.com/rebaudioside_a.php. p. 1-3.
Richman et al., "Fuctional genomics uncovers three glucosyltransferases involved in the synthesis of the major sweet glucosides of Stevia rebaudiana," The Plant Journal, vol. 41 (2005) 56-67.
Sakamoto et al., "Application of 13C NMR Spectroscopy to Chemistry of Natural Glycosides: Rebaudioside-C, a New Sweet Diterpene Glycoside of Stevia Rebaudiana", Chem. Pharm. Bull., vol. 25, 1977, 844-846.
Shi, et al. "Synthesis of bifuntional polymeric adsorbent and its application in purification of Stevia glycosides", Reactive & functional Polymers, vol. 50 2002, 107-116.
Shibata et al. "Glucosylation of Steviol and Steviol-Glucosides in Extracts from Stevia rebaudiana Bertoni," Plant Physiol. vol. 95, (1991) 152-156.
Starratt, et al. "Rebaudioside F, a diterpene glycoside from Stevia Rebaudiana", Phytochemistry, vol. 59 2002, 367-370.
Sweet Green Fields, LLC "Notice to the U.S. Food and Drug Administration (FDA) that the use of Rebiana (Rebaudiosid A) derived from Stevia rebaudiana, as a Food Ingredient is Generally Recognized as Safe (GRAS)," Jan. 15, 2009, http:/www.accessdata.fda.gov/scripts/fcn/gras_notices/gm000282.pdf (obtained from the Web on May 8, 2012) entire document esp. p. 22, Table 1.
Tanaka, O., "Improvement of taste of natural sweeteners," Pure & Appl. Chem., vol. 69, No. 4 1997, 675-683.
Teo, et al. "Validation of green-solvent extraction combined with Chromatographic chemical fingerprint to evaluate quality of Stevia reaudiana Bertoni", J. Sep. Sci, vol. 32 2009, 613-622.

(56) References Cited

OTHER PUBLICATIONS

Toyo sugar, "GRAS Exemption Claim for a-Glucosylated Steviol Glycosides" Office of Food Additive Safety. Feb. 23, 2011.
United Nations' Food and Agriculture Organization/Joint Expert Committee on Food Additives (2010) Steviol Glycosides, Compendium of Food Additive Specifications, FAO JECFA Monographs 10, 17-21.
Un "Steviol Glycosides" JECFA 2008 pp. 1-4, Un "Steviol Glycosides" JECFA 2008. pp. 1-4 http://www.fao.org/ag/agn/jecfa-additives/specs/monograph5/additive-442-m5.pdf.
Van der Maarel et al., "Properties and applications of starch-converting enzymes of the a-amylase family," Journal of Biotechnology, vol. 94 (220) 137-155.
Vasquez et al., Stimulation of the Gerbil's Gustatory Receptors by Some Potently Sweet Terpenoids, J. Agric. Food Chem., vol. 41, 1305-1310, 1993.
Wallin, "Steviol glycosides," 2004, XP002740430 ftp://ftp.fao.org/es/esn/jecfa/cta/CTA63_Steviol.pdf, pp. 1, 4, 5. Retrieved 2015.
Yamamoto, K. et al., "Effective Production of Glycosyl-steviosides by a-1, 6 Transglucosylation of Dextrin Dextranase", Biosci. Biotech. Biochem. vol. 58, No. 9 1994, 1657-1661.
Ye, et al. "Modification of stevioside using transglucosylation activity of Bacilllus amyloliquefaciens a-amylase to reduce its bitter aftertaste," LWT-Food Science and Technology, vol. 51, Issue 1, May 2013, pp. 524-530.
Yoshikawa, et al. "Transglycosylation of Mogroside V, a Triterpene Glycoside in *Siraitia grosvenori*, by Cyclodextrin Glucanotransferase and Improvement of the Qualities of Sweetness," The Japanese Society of Applied Glycoscience, vol. 52, No. 3, 2005, p. 247-252.
Yoda, et al. "Supercritical fluid extraction from Stevia rebaudiana Bertoni using CO2 and CO2+ water: extraction kinetics and identification of extracted components", Journal of Food Engineering, vol. 57 2003, 125-134.
Remington: The Science and Practice of Pharmacy, 21st Edition. The University of the Sciences in Philadelphia, 2006. Part 5, p. 700.
"Toxicity, Alcohols". Available online as of Jan. 29, 2010 from emedicine.medscape.com. pp. 1-4.
Zell, et al. "Investigation of Polymorphism in Aspartame and Neotame Using Solid-State NMR Spectroscopy", Tetrahedron, vol. 56, 2000, 6603-6616.
"Methanol". Available online from Sigma-Aldrich as of Jan. 4, 2016. pp. 1-2.
"Acetone". Available online from Sigma-Aldrich as of Jan. 4, 2016. pp. 1-2.
Zhang, et al. "Membrane-based separation schemem for processing sweetener from Stevia leaves", Food Research International, vol. 33 2000, 617-620.
Harman et al. "Sensory Testing for Flavorings with Modifying Properties", ift.org, No. 2013, vol. 67, No. 11, 15 pages.
Chaturvedula et al., "Two Minor Diterpene Glycosides from the Leaves of Stevia rebaudiana", Natural Product Communications, 2011, vol. 6, No. 2, pp. 175-178.
Rajbhandari et al., "The Flavonoids of Stevia Rebaudiana", Department of Pharmacognosy, Mar.-Apr. 1983, pp. 194-195.
Markovic et al., "Chemical composition of leaf extracts of Stevia rebaudiana Bergoni grown experimentally in Vogvodina", J. Serb. Chem. Soc. 73 (3) 283-297 (2008).
Goyal et al., "Stevia (*Stevia rebaudiana*) a bio-sweetener: a review", International Journal of Food Sciences and Nutrition, Feb. 2010; 61(1): pp. 1-10.
Chaturvedula et al., "Structures of the novel diterpene glycosides from Stevia rebaudiana", Carbohydrate Research 346 (2011) pp. 1057-1060.
Author: Rajbhandari, et al. Title: The Flavonoids of Stevia Rebaudiana Publication Date: Mar. 1983 pp. 194-195 Journal: Journal of Natural Products; 46(2), (1983) Publisher: American Chemical Society.†
Author: Ceunen, et al.Title: Steviol Glycosides: Chemical Diversity, Metabolism, and FunctionPublication Date: May 28, 2013 pp. 1201-1228Journal: Journal of Natural Products; 76, (2013)Publisher: American Chemical Society and American Society of Pharmacognosy.†
Author: Ohta, et al.Title: Characterization of Novel Steviol Glycosides from Leaves of Stevia rebaudiana MoritaPublication Date: 2010 pp. 199-209Journal: Journal of Applied Glycoscience 57, (2010)Publisher: The Japanese Society of Applied Glycoscience.†

\* cited by examiner
† cited by third party

FIG. 1

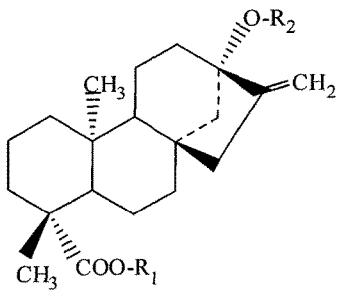

| Compound name | $R_1$ (C-19) | $R_2$ (C-13) |
| --- | --- | --- |
| 1. Steviol | H | H |
| 2. Steviolmonoside | H | β-Glc |
| 3. Rubusoside | β-Glc | β-Glc |
| 4. Steviolbioside | H | β-Glc-β-Glc(2→1) |
| 5. Stevioside | β-Glc | β-Glc-β-Glc(2→1) |
| 6. Rebaudioside A | β-Glc | β-Glc-β-Glc(2→1)<br>    |<br>β-Glc(3→1) |
| 7. Rebaudioside B | H | β-Glc-β-Glc(2→1)<br>    |<br>β-Glc(3→1) |
| 8. Rebaudioside C (Dulcoside B) | β-Glc | β-Glc-α-Rha(2→1)<br>    |<br>β-Glc(3→1) |
| 9. Rebaudioside D | β-Glc-β-Glc(2→1) | β-Glc-β-Glc(2→1)<br>    |<br>β-Glc(3→1) |
| 10. Rebaudioside E | β-Glc-β-Glc(2→1) | β-Glc-β-Glc(2→1) |
| 11. Rebaudioside F | β-Glc | β-Glc-β-Xyl(2→1)<br>    |<br>β-Glc(3→1) |
| 12. Dulcoside A | β-Glc | β-Glc-α-Rha(2→1) |

STEVIA EXTRACT CONTAINING SELECTED STEVIOL GLYCOSIDES AS FLAVOR, SALTY AND SWEETNESS PROFILE MODIFIER

RELATED APPLICATIONS

This application is a continuation-in-part application of U.S. patent application Ser. No. 14/896,022, filed on Dec. 4, 2015, which is a national phase application of International Application No. PCT/US2014/041548, filed on Jun. 9, 2014, and claims the benefit of priority to U.S. Patent Application No. 61/832,451, filed on Jun. 7, 2013, and U.S. Patent Application No. 61/942,331, filed on Feb. 20, 2014, the contents of which applications are incorporated by reference herein in their entirety.

FIELD OF THE INVENTION

The invention relates to the use of stevia extracts as flavor modifiers that contain mixtures of steviol glycosides extracted from Stevia rebaudiana plant. This invention also relates to the application of the above-said stevia extracts as sweetness profile modifier, not a sweetener, with other natural and artificial sweeteners. This invention also relates to the production and use of the above-mentioned stevia extracts that can be used as flavor and sweetness profile modifier when used in food, beverage, and pharmaceutical products.

BACKGROUND

High intensity sweeteners possess sweetness level many times exceeding that of sucrose. They are essentially non-caloric and used widely in manufacturing of diet and reduced calorie food. Although natural caloric sweetener such as sucrose, fructose, and glucose provide the most desirable taste to consumers, they are caloric. High intensity sweeteners do not affect the blood glucose level and provide little or no nutritive value.

However, high intensity sweeteners that generally are used as substitutes for sucrose possess taste characteristics different than that of sugar, such as sweet taste with different temporal profile, maximal response, flavor profile, mouth-feel, and/or adaptation behavior than that of sugar. For example, the sweet taste of some high-potency sweeteners is slower in onset and longer in duration than that of sugar and thus changes the taste balance of a food composition. Because of these differences, usage of high-potency sweetener in replacing such a bulk sweetener as sugar in a food or beverage causes imbalance in temporal and/or flavor profile. If the taste profile of high-potency sweeteners could be modified to impart desired taste characteristics, it can provide low calorie beverages and food products with taste characteristics more desirable for consumers. To attain the sugar-like temporal and/or flavor profile, several ingredients have been suggested in different publications.

Non-limiting examples of synthetic sweeteners include sucralose, potassium acesulfame, aspartame, alitame, saccharin, neohesperidin dihydrochalcone synthetic derivatives, cyclamate, neotame, dulcin, suosan, N—[N-[3-(3-hydroxy-4-methoxyphenyl)propyl]-L-α-aspartyl]-L-phenylalanine 1-methyl ester, N—[N-[3-(3-hydroxy-4-methoxyphenyl)-3-methylbutyl]-L-α-aspartyl]-L-phenylalanine 1-methyl ester, N—[N-[3-(3-methoxy-4-hydroxyphenyl)propyl]-L-α-aspartyl]-L-phenylalanine 1-methyl ester, salts thereof, and the like.

Non-limiting examples of natural high intensity sweeteners include Stevioside, Rebaudioside A, Rebaudioside B, Rebaudioside C, Rebaudioside E, Rebaudioside F, Steviolbioside, Dulcoside A, Rubusoside, mogrosides, brazzein, neohesperidin dihydrochalcone (NHDC), glycyrrhizic acid and its salts, thaumatin, perillartine, pernandulcin, mukuroziosides, baiyunoside, phlomisoside-I, dimethyl-hexahydrofluorene-dicarboxylic acid, abrusosides, periandrin, carnosiflosides, cyclocarioside, pterocaryosides, polypodoside A, brazilin, hernandulcin, phillodulcin, glycyphyllin, phlorizin, trilobatin, dihydroflavonol, dihydroquercetin-3-acetate, neoastilibin, trans-cinnamaldehyde, monatin and its salts, selligueain A, hematoxylin, monellin, osladin, pterocaryoside A, pterocaryoside B, mabinlin, pentadin, miraculin, curculin, neoculin, chlorogenic acid, cynarin, siamenoside and others.

High intensity sweeteners can be derived from the modification of natural high intensity sweeteners, for example, by fermentation, enzymatic treatment, or derivatization.

A growing number of consumers perceive the ability to control their health by enhancing their current health and/or hedging against future diseases. This creates a demand for food products with enhanced characteristics and associated health benefits, specifically a food and consumer market trend towards "whole health solutions" lifestyle. The term "natural" is highly emotive in the world of sweeteners and has been identified as one of key trust, along with "whole grains", "heart-healthy" and "low-sodium". 'Natural' term is closely related to 'healthier'.

Stevia rebaudiana is a perennial shrub of the Asteraceae (Compositae) family native to certain regions of South America. The leaves of the plant contain from 10 to 20% of diterpene glycosides, which are around 150 to 450 times sweeter than sugar. The leaves have been traditionally used for hundreds of years in Paraguay and Brazil to sweeten local beverages, foods and medicines.

At present there are more than 230 Stevia species with significant sweetening properties. The plant has been successfully grown under a wide range of conditions from its native subtropics to the cold northern latitudes.

Steviol glycosides have zero calories and can be used wherever sugar is used. They are ideal for diabetic and low calorie diets. In addition, the sweet steviol glycosides possess functional and sensory properties superior to those of many high potency sweeteners.

The extract of Stevia rebaudiana plant contains a mixture of different sweet diterpene glycosides, which have a single base—steviol and differ by the presence of carbohydrate residues at positions C13 and C19. These glycosides accumulate in Stevia leaves and compose approximately 10%-20% of the total dry weight. Typically, on a dry weight basis, the four major glycosides found in the leaves of Stevia are Dulcoside A (0.3%), Rebaudioside C (0.6%), Rebaudioside A (3.8%) and Stevioside (9.1%). Other glycosides identified in Stevia extract include Rebaudioside B, C, D, E, and F, Steviolbioside and Rubusoside (FIG. 1).

The chemical structures of the diterpene glycosides of Stevia rebaudiana are presented in FIG. 1. The physical and sensory properties are well studied only for Stevioside and Rebaudioside A. The sweetness potency of Stevioside is around 210 times higher than sucrose, Rebaudioside A around 300 times, and Rebaudioside C and Dulcoside A around 30 times. The Stevia extract containing Rebaudioside A and Stevioside as major components showed sweetness potency around 250 times. Rebaudioside A and Rebaudioside D are considered to have most favorable sensory attributes of all major Steviol Glycosides (TABLE 1).

TABLE 1

| Name | Formula | $T_{Melt}$, °C. | Mol. Weight | Solubility in water, % | Relative sweetness | Quality of taste |
|---|---|---|---|---|---|---|
| Steviol | $C_{20}H_{30}O_3$ | 212-213 | 318.45 | ND | ND | Very bitter |
| Steviolmonoside | $C_{26}H_{40}O_8$ | ND | 480.58 | ND | ND | ND |
| Stevioside | $C_{38}H_{60}O_{18}$ | 196-198 | 804.88 | 0.13 | 210 | Bitter |
| Rebaudioside A | $C_{44}H_{70}O_{23}$ | 242-244 | 967.01 | 0.80 | 200-400 | Less Bitter |
| Rebaudioside B | $C_{38}H_{60}O_{18}$ | 193-195 | 804.88 | 0.10 | 150 | Bitter |
| Rebaudioside C | $C_{44}H_{70}O_{22}$ | 215-217 | 951.01 | 0.21 | 30 | Bitter |
| Rebaudioside D | $C_{50}H_{80}O_{28}$ | 248-249 | 1129.15 | 1.00 | 220 | Like sucrose |
| Rebaudioside E | $C_{44}H_{70}O_{23}$ | 205-207 | 967.01 | 1.70 | 170 | Like sucrose |
| Rebaudioside F | $C_{43}H_{68}O_{22}$ | ND | 936.99 | ND | ND | ND |
| Dulcoside A | $C_{38}H_{60}O_{17}$ | 193-195 | 788.87 | 0.58 | 30 | Very bitter |
| Steviolbioside | $C_{32}H_{50}O_{13}$ | 188-192 | 642.73 | 0.03 | 90 | Unpleasant |
| Rubusoside | $C_{32}H_{50}O_{13}$ | ND | 642.73 | ND | 110 | Very bitter |

In addition to the commercially known steviol glycosides (Table 1), several new steviol glycosides (glycosylated diterpene) have been found in stevia leaf extracts, as shown in Table 2a.

TABLE 2a

Summary of formula and R-groups of identified steviol glycosides
(see FIG. 1 for backbone structure)

| # | Common name | Trivial formula | Mol. Wt. | $R_1$ | $R_2$ | Reference |
|---|---|---|---|---|---|---|
| | 1. Steviol + Glucose (SvGn) | | | | | |
| 1.1 | Steviolmonoside | SvG1 | 481 | H | Glcβ1- | Ohta et al. (2010) |
| 1.2 | Steviolmonoside A | SvG1 | 481 | Glcβ1- | H | Gardena et al. (2010) |
| 1.3 | Rubusoside | SvG2 | 643 | Glcβ1- | Glcβ1- | Ohta et al. (2010) |
| 1.4 | Steviolbioside | SvG2 | 643 | H | Glcβ(1-2) Glcβ1- | Kohda et al. (1976) |
| 1.5 | Stevioside | SvG3 | 805 | Glcβ1- | Glcβ(1-2) Glcβ1- | Bridel & Lavielle (1931) |
| 1.6 | Stevioside A | SvG3 | 805 | Glcβ(1-2) Glcβ1- | Glcβ1- | Wu et al. (2012) |
| 1.7 | Rebaudioside B | SvG3 | 805 | H | Glcβ(1-2) [Glcβ(1-3)] Glcβ1- | Kohda et al. (1976) |
| 1.8 | Rebaudioside G | SvG3 | 805 | Glcβ1- | Glcβ(1-3) Glcβ1- | Ohta et al. (2010) |
| 1.9 | Stevioside B | SvG3 | 805 | Glcβ(1-3) Glcβ1- | Glcβ1- | Chaturvedula & Zamora (2014) |
| 1.10 | Rebaudioside E | SvG4 | 967 | Glcβ(1-2) Glcβ1- | Glcβ(1-2) Glcβ1- | Sakamoto et al. (1977a) |
| 1.11 | Rebaudioside A | SvG4 | 967 | Glcβ1- | Glcβ(1-2) [Glcβ(1-3)] Glcβ1- | Kohda et al. (1976) |
| 1.12 | Rebaudioside A2 | SvG4 | 967 | Glcβ1- | Glcβ(1-6) Glcβ(1-2) Glcβ1- | Chaturvedula & Prakash (2011d) |
| 1.13 | Rebaudioside D | SvG5 | 1129 | Glcβ(1-2) Glcβ1- | Glcβ(1-2) [Glcβ(1-3)] Glcβ1- | Sakamoto et al. (1977a) |
| 1.14 | Rebaudioside I | SvG5 | 1129 | Glcβ(1-3) Glcβ1- | Glcβ(1-2) [Glcβ(1-3)] Glcβ1- | Ohta et al. (2010) |
| 1.15 | Rebaudioside L | SvG5 | 1129 | Glcβ1- | Glcβ(1-6) Glcβ(1-2) [Glcβ(1-3)] Glcβ1- | Ohta et al. (2010) |
| 1.16 | Rebaudioside Q2 | SvG5 | 1129 | Glcα(1-2) Glcα(1-4) Glcβ1- | Glcβ(1-2) Glcβ1- | Chaturvedula & Prakash (2011c) |

TABLE 2a-continued

Summary of formula and R-groups of identified steviol glycosides
(see FIG. 1 for backbone structure)

| # | Common name | Trivial formula | Mol. Wt. | $R_1$ | $R_2$ | Reference |
|---|---|---|---|---|---|---|
| 1.17 | Rebaudioside Q | SvG5 | 1129 | Glcβ1- | Glcα(1-4)<br>Glcβ(1-2)<br>[Glcβ(1-3)]<br>Glcβ1- | — |
| 1.18 | Rebaudioside I2 | SvG5 | 1129 | Glcβ1- | Glcα(1-3)<br>Glcβ(1-2)<br>[Glcβ(1-3)]<br>Glcβ1- | Chaturvedula et al. (2011c) |
| 1.19 | Rebaudioside Q3 | SvG5 | 1129 | Glcβ1- | Glcα(1-4)<br>Glcβ(1-3)<br>[Glcβ(1-2)]<br>Glcβ1- | Chaturvedula et al. (2011c) |
| 1.20 | Rebaudioside I3 | SvG5 | 1129 | Glcβ(1-2)<br>[Glcβ(1-6)]<br>Glcβ1- | Glcβ(1-2)<br>Glcβ1- | Chaturvedula et al. (2011c) |
| 1.21 | Rebaudioside M | SvG6 | 1291 | Glcβ(1-2)<br>[Glcβ(1-3)]<br>Glcβ1- | Glcβ(1-2)<br>[Glcβ(1-3)]<br>Glcβ1- | Ohta et al. (2010) |
| 2. Steviol + Rhamnose + Glucose (SvR1Gn) | | | | | | |
| 2.1 | Dulcoside A | SvR1G2 | 789 | Glcβ1- | Rhaα(1-2)<br>Glcβ1- | Kobayashi et al. (1977) |
| 2.2 | Dulcoside B | SvR1G2 | 789 | H | Rhaα(1-2)<br>[Glcβ(1-3)]<br>Glcβ1- | Ohta et al. (2010) |
| 2.3 | Rebaudioside C | SvR1G3 | 951 | Glcβ1- | Rhaα(1-2)<br>[Glcβ(1-3)]<br>Glcβ1- | Sakamoto et al. (1977b) |
| 2.4 | Rebaudioside C2$^a$ | SvR1G3 | 951 | Rhaα(1-2)<br>Glcβ1- | Glcβ(1-2)<br>Glcβ1- | Purkayastha (2016) |
| 2.5 | Rebaudioside S | SvR1G3 | 951 | Rhaα(1-2)<br>Glcβ1- | Glcα(1-2)<br>Glcβ1- | Ibrahim et al (2016) |
| 2.6 | Rebaudioside H | SvR1G4 | 1112 | Glcβ1- | Glcβ(1-3)<br>Rhaα(1-2)]<br>[Glcβ(1-3)]<br>Glcβ1- | Ohta et al. (2010) |
| 2.7 | Rebaudioside K | SvR1G4 | 1112 | Glcβ(1-2)<br>Glcβ1- | Rhaα(1-2)<br>[Glcβ(1-3)]<br>Glcβ1- | Ohta et al. (2010) |
| 2.8 | Rebaudioside J | SvR1G4 | 1112 | Rhaα(1-2)<br>Glcβ1- | Glcβ(1-2)<br>[Glcβ(1-3)]<br>Glcβ1- | Ohta et al. (2010) |
| 2.9 | Rebaudioside N | SvR1G5 | 1274 | Rhaα(1-2)<br>[Glcβ(1-3)]<br>Glcβ1- | Glcβ(1-2)<br>[Glcβ(1-3)]<br>Glcβ1- | Ohta et al. (2010) |
| 2.10 | Rebaudioside O | SvR1G6 | 1436 | Glcβ(1-3)<br>Rhaα(1-2)<br>[Glcβ(1-3)]<br>Glcβ1- | Glcβ(1-2)<br>[Glcβ(1-3)]<br>Glcβ1- | Ohta et al. (2010) |
| 2.11 | Rebaudioside O2$^a$ | SvR1G6 | 1436 | Glcβ(1-4*)<br>Rhaα(1-2)<br>[Glcβ(1-3)]<br>Glcβ1- | Glcβ(1-2)<br>[Glcβ(1-3)]<br>Glcβ1- | Purkayastha (2016) |
| 2.12 | Rebaudioside K2$^a$ | SvR1G4 | 1112 | Glcβ(1-6)<br>Glcβ1- | Rhaα(1-2)<br>[Glcβ(1-3)]<br>Glcβ1- | Purkayastha (2016) |
| 3. Steviol + Xylose + Glucose (SvX1Gn) | | | | | | |
| 3.1 | Stevioside F | SvX1G2 | 775 | Glcβ1- | Xylβ(1-2)<br>Glcβ1- | Chaturvedula & Prakash (2011b) |
| 3.2 | Rebaudioside F | SvX1G3 | 937 | Glcβ1- | Xylβ(1-2)<br>[Glcβ(1-3)]<br>Glcβ1- | Starratt et al. (2002) |
| 3.3 | Rebaudioside F2 | SvX1G3 | 937 | Glcβ1- | Glcβ(1-2)<br>[Xylβ(1-3)]<br>Glcβ1- | Chaturvedula & Prakash (2011b) |
| 3.4 | Rebaudioside F3 | SvX1G3 | 937 | Xylβ(1-6)<br>Glcβ1- | Glcβ(1-2)<br>Glcβ1- | Chaturvedula et al. (2011d) |
| 3.5 | Rebaudioside R | SvX1G3 | 937 | Glcβ1- | Glcβ(1-2)<br>[Glcβ(1-3)]<br>Xylβ1- | Ibrahim et al (2016) |

TABLE 2a-continued

Summary of formula and R-groups of identified steviol glycosides
(see FIG. 1 for backbone structure)

| # | Common name | Trivial formula | Mol. Wt. | $R_1$ | $R_2$ | Reference |
|---|---|---|---|---|---|---|
| 3.6 | Rebaudioside U[a] | SvX1G4 | 1099 | Xylβ(1-2) Glcβ1- | Glcβ(1-2) [Glcβ(1-3)] Glcβ1- | Purkayastha (2016) |
| 3.7 | Rebaudioside U2[a] | SvX1G4 | 1099 | Xylβ(1-2*) [Glcβ(1-3)] Glcβ1- | Glcβ(1-2) Glcβ1- | Purkayastha (2016) |
| 3.8 | Rebaudioside V[a] | SvX1G5 | 1261 | Glcβ(1-2) [Glcβ(1-3)] Glcβ1- | Xylβ(1-2*) [Glcβ(1-3)] Glcβ1- | Purkayastha (2016) |
| 3.9 | Rebaudioside V2[a] | SvX1G5 | 1261 | Xylβ(1-2) [Glcβ(1-3)] Glcβ1- | Glcβ(1-2) [Glcβ(1-3)] Glcβ1- | Prakash & Chaturvedula (2013) |
| | 4. Steviol + Arabinose + Glucose (SvA1Gn) | | | | | |
| 4.1 | Rebaudioside W[a] | SvA1G4 | 1098 | Glcβ(1-2) [Araβ(1-3*)] Glcβ1- | Glcβ(1-2) Glcβ1- | Purkayastha (2016) |
| 4.2 | Rebaudioside W2[a] | SvA1G4 | 1098 | Araβ(1-2*) Glcβ1- | Glcβ(1-2) [Glcβ(1-3)] Glcβ1- | Purkayastha (2016) |
| 4.3 | Rebaudioside W3[a] | SvA1G4 | 1098 | Araβ(1-6) Glcβ1- | Glcβ(1-2) [Glcβ(1-3)] Glcβ1- | Purkayastha (2016) |
| 4.4 | Rebaudioside Y[a] | SvA1G5 | 1260 | Glcβ(1-2) [Araβ(1-3*)] Glcβ1- | Glcβ(1-2) [Glcβ(1-3)] Glcβ1- | Purkayastha (2016) |
| | 5. Steviol + Fructose + Glucose (SvF1Gn) | | | | | |
| 5.1 | Rebaudioside A3 | SvF1G3 | 967 | Glcβ1- | Glcβ(1-2) [Fruβ(1-3)] Glcβ1- | Chaturvedula et al. (2011b) |
| | 6. Steviol + galactose + Glucose (SvGa1Gn) | | | | | |
| 6.1 | Rebaudioside T[a] | SvGa1G4 | 1128 | Glcβ(1-2*) Glcβ1 | Glcβ(1-2) [Glcβ(1-3)] Glcβ1- | Purkayastha (2016)^ |
| | 7. Steviol + de-oxy glucose + Glucose (SvdG1Gn) | | | | | |
| 7.1 | Stevioside D | SvdG1G2 | 789 | Glcβ1- | 6-deoxyGlcβ (1-2) Glcβ1- | Chaturvedula & Prakash (2011a) |
| 7.2 | Stevisoide E | SvdG1G3 | 951 | Glcβ1- | 6-deoxyGlcβ (1-2) [Glcβ(1-3)] Glcβ1- | Chaturvedula & Prakash (2011a) |
| 7.3 | Stevioside E2 | SvdG1G3 | 951 | 6-deoxyGlcβ1- | Glcβ(1-2) [Glcβ(1-3)] Glcβ1- | Chaturvedula et al. (2011e) |

Besides diterpene glycosides, a number of flavonoids, labdane diterpene, triterpenes, sterols, and volatile oils have also been found in the extracts of *Stevia rebaudiana*, collectively referred to as plant molecules, as shown in Table 2b.

TABLE 2b

| Chemical Classes | Chemical Components |
|---|---|
| Monoterpenoids | Borneol |
| Diterpenoids | Austroinulin, 6-0-acetyl austroinulin, 6-acetyl austroinulin 7-0-acetyl austroinulin, Sterebin A, B, C, D, E, F, G, H, Jhanol |
| Triterpenoids | Amyrin beta acetate |
| Sesquiterpenes | α-bergamotene, Bisabolene, β-bourbonene, δ-cadinene, γ-cadinene |
| Essential oils | β-caryophyllene, Trans β-tarnesene, α-humulene, δ-cadiene caryophyllene oxide, Nerolidol, Linalol, α-terpineol, Terpinen-4-ol |
| Sterol derivatives | Stigmasterol, β-sitosterol, Campesterol |
| Flavonoids | Glucosyl-4'-O-apigenin, Glucosyl-7-O-luteolin, Rhamnosyl-3-O-kaempferol, Quercetin, Glucosyl-3-O-quercetin, Arabinosyl-3-O-quercetin, 5,7,3'-methoxyflavone, 3,6,4'-methoxyflavone, Centaureidin, avicularin |

All steviol glycosides provide sweetness and other taste attributes at a higher than certain threshold level of concentrations in water. Below the threshold level of concentration, the steviol glycoside components and their mixtures as found in a typical non-limiting stevia extract as shown below has no recognizable sweetness taste. But such stevia extract below the threshold level of significant sweetness recognition show remarkable characteristics of sweet and flavor profile modification in food and beverage applications.

This invention relates to use of the following stevia extracts (Table 3) with the varying level of different steviol glycosides and other stevia plant-derived glycosides, the combination of which contributes no significant sweetness but modifies flavor and sweetness profile at certain concentration in typical food and beverage applications.

which can be blended with other synthetic non-caloric sweeteners to impart more desirable sweetness profile. Non-limiting examples of synthetic sweeteners include sucralose, potassium acesulfame, aspartame, alitame, advantame, saccharin, neohesperidin dihydrochalcone synthetic derivatives, cyclamate, neotame, dulcin, suosan, N—[N-[3-(3-hydroxy-4-methoxyphenyl)propyl]-L-α-aspartyl]-L-phenylalanine 1-methyl ester, N—[N-[3-(3-hydroxy-4-methoxyphenyl)-3-methylbutyl]-L-α-aspartyl]-L-

TABLE 3

| Stevia Extracts | Steviol Glycosides*, % | | | | | | | | | | | | TSG* (%) | Minor Steviol Glycosides and related plant molecules |
|---|---|---|---|---|---|---|---|---|---|---|---|---|---|---|
| | Reb A | Stevio-side | Reb D | Reb F | Reb C | Dulco-side A | Rubu-soside | Reb B | Steviol-bioside | Reb E | Reb N | Reb O | | |
| PCS-5001 | 10-20 | 4-12 | 1-4 | 1-5 | 10-25 | 1-5 | 1-4 | 0.5-5 | 0.5-5 | 1-4 | 0.5-4 | 0.5-4 | 45-65 | 35-50 |
| PCS-1015 | 18-25 | 5-10 | 8-20 | 0-1 | 1-3 | 0-1 | 0-1 | 0.5-5 | 0-1 | 2-6 | 4-8 | 3-8 | 55-65 | 35-45 |
| PSB-5005 | 15-30 | 3-12 | 1-10 | 0-5 | 5-15 | 0-5 | 0-5 | 0-8 | 0-5 | 0-5 | 0-6 | 0-5 | 45-70 | 30-55% |

*TSG or Total Steviol Glycosides contain the Steviol Glycosides that are recognized by Codex Alimentarius (a commission of FAO and WHO) and major regulatory authorities The present invention also relates to the stevia extracts that contain major steviol glycosides (Table 3) and other minor steviol glycosides and glycosylated diterpene derivatives (water soluble molecules). The non-limiting examples of such minor molecules are Reb E, Reb G, Reb H, Reb I, Reb K, Reb L, Reb M, Reb N, Reb O (M. Ohta, S. Sasa, A. Inoue, et al. "Characterization of Novel Steviol Glycosides from Leaves of Stevia rebaudiana Morita." *J. Appl. Glycosci.*, 57, 199-209 (2010)).

The present invention is also directed to a method of making a specific stevia extract composition, including: extracting steviol glycosides and other water soluble molecules from leaves of a Stevia rebaudiana plant, and separating the excess steviol glycosides than the amount and type of steviol glycosides required to contribute the taste and flavor modifying characteristics of the stevia extract.

This invention combine the different natural sweeteners, especially steviol glycosides in certain proportion along with other water soluble molecules to provide enhanced sweetness and flavor profile in food and beverage application, which can be blended with other natural caloric sweeteners to impart more desirable sweetness profile. Non-limiting examples of caloric sweeteners include dextrose, fructose, sucrose, maltose, lactose, corn syrup, gluco-syrup derived from different carbohydrates, cane syrup, flavored sugar, honey, molasses, This invention combine the different natural sweeteners, especially steviol glycosides in certain proportion along with other water soluble molecules to provide enhanced sweetness and flavor profile in food and beverage application, which can be blended with other natural non-caloric sweeteners to impart more desirable sweetness profile. Non-limiting examples of natural high intensity sweeteners include steviol glycosides, brazzein, monatin and its salt, neohesperidin dihydrochalcone (NHDC), glycyrrhizic acid and its salts, thaumatin, mogrosides and lu han guo extracts, perillartine, mabinlin, pentadin, miraculin, curculin, neoculin, chlorogenic acid, cynarin, siamenoside and others.

This invention combine the different natural sweeteners, especially steviol glycosides in certain proportion along with other water soluble molecules to provide enhanced sweetness and flavor profile in food and beverage application, phenylalanine 1-methyl ester, N—[N-[3-(3-methoxy-4-hydroxyphenyl)propyl]-L-α-aspartyl]-L-phenylalanine 1-methyl ester, salts thereof, and the like.

BRIEF SUMMARY OF THE INVENTION

The present invention is directed to a taste and flavor modifying composition. The composition includes different steviol glycosides with other water soluble molecules derived from Stevia leaf, such as non-limiting examples of plant glycosides, flavonoids, labdane diterpene, triterpenes, which can modify the intensity of a taste and/or a flavor in a food or beverage product.

The present invention is also directed to a food or beverage product having an intense taste and flavor profile, wherein the food or beverage product includes a taste and flavor modifying composition comprising the stevia extract of steviol glycosides and water soluble molecules derived from stevia plant. A wide range of food and beverage products, such as, but not limited to, carbonated soft drinks, fruit juices, dairy foods, dairy beverages, baked goods, cereal products, snack foods, and table top sweeteners, may be made in accordance with the present invention. The taste and flavor profile of a food or beverage product including a taste and flavor modifying composition, wherein the taste and flavor modifying composition comprising the stevia extract of steviol glycosides and water soluble molecules derived from stevia plant, may be more intense than a comparative taste and flavor profile of a comparative food or beverage product which does not include the taste and flavor modifying composition. Moreover, the mouthfeel and overall taste perception of a food or beverage product including the taste and flavor modifying composition, wherein the taste and flavor enhancing composition includes the complex mixture of steviol glycosides and water soluble molecules, may be improved in relation to a mouthfeel and overall taste perception of a comparative food or beverage product which does not include the taste and flavor enhancing composition.

The present invention is further directed to a method of increasing the taste and flavor intensity of a food or beverage product, including the step of adding a taste and flavor enhancing composition to the food or beverage product, wherein the taste and flavor modifying composition comprising the stevia extract of steviol glycosides and water soluble molecules derived from stevia plant. The present invention is also directed to a method of improving the organoleptic properties of a food or beverage product including a high fructose syrup, including the step of adding the taste and flavor modifying composition to the food or beverage product. For example, adding the taste and flavor modifying composition may cause the high fructose syrup, such as high fructose corn syrup, to taste more like sugar. Also, if the high fructose syrup is high fructose corn syrup 42 (HFCS 42), adding the taste and flavor enhancing composition may cause the HFCS 42 to taste more like high fructose corn syrup 55 (HFCS 55).

The present invention is further directed to a method of increasing the taste and flavor intensity of a medical food and pharma product, including the step of adding a taste and flavor modifying composition to the food or beverage product, wherein the taste and flavor modifying composition comprising the stevia extract of selected steviol glycosides and water soluble molecules derived from stevia plant. The present invention is also directed to a method of improving the organoleptic properties of a medical food or pharma product containing functional food ingredients like vitamins, minerals and amino acids, including the step of adding the taste and flavor modifying composition to the food or beverage product. For example, adding the taste and flavor modifying composition may cause the off-taste due to vitamins, mineral, amino acids and other non-limiting functional ingredients, to improve taste and palatability.

The present invention is also directed to a method of making a taste and flavor enhancing composition, including: extracting steviol glycosides and other water soluble molecules from leaves of a *Stevia rebaudiana* plant, and separating the excess steviol glycosides than the amount and type of steviol glycosides required to contribute the taste and flavor modifying characteristics of the stevia extract.

The foregoing has outlined rather broadly the features and technical advantages of the present invention in order that the detailed description of the invention that follows may be better understood. Additional features of the invention which form the subject of the claims of the invention will be described hereinafter. It should be appreciated by those skilled in the art that the specific embodiments disclosed may be readily utilized as a basis for modifying or designing other methods or structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description.

BRIEF DESCRIPTION OF THE DRAWINGS

FIG. 1 shows the chemical structure of the diterpene glycosides of *Stevia rebaudiana*.

DETAILED DESCRIPTION

Figure 2:
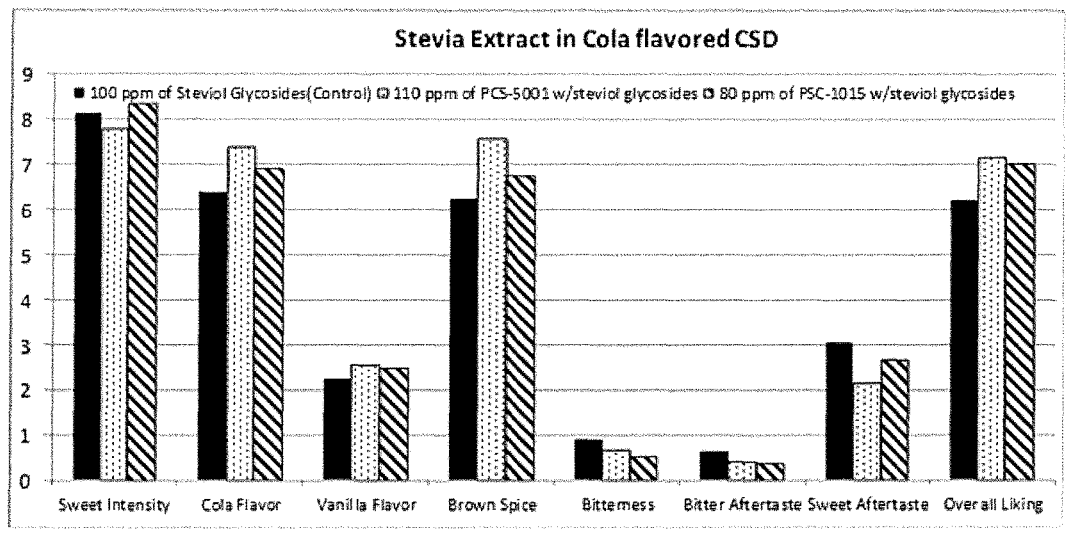
FIG. 2 is a bar graph showing the modification of flavor and sweetness profiles caused by the addition of stevia extract to a cola flavored carbonated soft drink.

Embodiments of the present invention are described in the following examples.

EXAMPLES

Example 1A: Detection of Concentration Threshold for Sweetness Recognition

To detect the sweetness recognition level of PCS-5001, PCS 1015 and PSB 5005 (stevia extract), the test method outlined by Harman, et al (Food Technology, November 2013) was used with ten trained panelists that have been previously qualified for their taste acuity and trained in the use of a sweetness intensity rating scale. The panelists evaluated a series of aqueous solutions of sucrose and the stevia extract (PCS-5001, PCS-1015, or PSB 5005) at room temperature; the sucrose solutions of 1.5% concentration and the stevia extract solutions with concentrations ranging between 100 and 120 ppm for PCS-5001, 70-80 ppm for PCS-1015, and 60-70 ppm for PSB 5005 were prepared with filtered water. The objective of the test was to determine the sweetness recognition level of the stevia extract. The evaluations were done in triplicate using the same panelists so that a total of 30 values were generated for each average data point.

The samples were coded and presented in random order to panel members to taste and determine which sample was sweeter (ASTM E2164-08: Standard Method for Directional Difference Test). Panelists were asked to focus only on sweet attribute of those samples and to use warm water and salt solution in order to cleanse the palate between samples.

The results were tallied and significance was calculated by SIM 2000 (Sensory Computer System, NJ). Results are presented in Table 4. The overall sweetness of those samples was barely detectable. The 2-AFC shows that 100 ppm PCS-5001, 70 ppm of PCS-1015 and 60 ppm of PSB 5005 solutions were the least sweet samples and were significantly less sweet then the 1.5% sugar control. The sample with 120 ppm PCS-5001 and 80 ppm PCS-1015 were the sweetest samples showing significantly higher sweetness than the 1.5% sugar control (Table 4). The recognition threshold concentration of STEVIA EXTRACT (PCS-5001) in water was determined to be 100 ppm. The recognition threshold concentration of STEVIA EXTRACT (PCS-1015) in water was determined to be 70 ppm. The sweetness recognition threshold of STEVIA EXTRACT (PSB 5005) in water was determined to be 60 ppm.

TABLE 4

Sweetness perception of *Stevia* Extract in different concentration against 1.5% sugar solution.

| Comparison of sweetness perception of *STEVIA* EXTRACT in water | Sugar solution (1.5%) sweeter? | *Stevia* Extract solution sweeter? | P-Value | Significance |
|---|---|---|---|---|
| PCS-5001: 100 ppm, N = 30 | 23 | 7 | 0.0052 | *** |
| PCS-5001: 110 ppm, N = 30 | 20 | 10 | 0.0987 | ** |
| PCS-5001: 120 ppm, N = 30 | 9 | 21 | 0.0457 | *** |
| PCS-1015: 70 ppm, N = 30 | 26 | 4 | 0.0001 | *** |
| PCS-1015: 80 ppm, N = 30 | 5 | 25 | 0.0003 | *** |
| PSB 5005: 60 ppm, N = 30 | 24 | 6 | 0.0014 | *** |
| PSB 5005: 70 ppm, N = 30 | 19 | 11 | 0.2005 | NS |

Example 1B: Sweetness Detection of Concentration Threshold for Sweetness Detection The ten panel members evaluated a series of lemon-lime flavored carbonated soft drink (CSD) sweetened with sucrose and STEVIA EXTRACT at room temperature; the evaluations were done in triplicate using the same panelists so that at least 30 values were generated for each average data point. The lemon lime flavored carbonated soft drink control sample had 1.5% sucrose concentration and the test sample contained STEVIA EXTRACT (PCS-5001) with concentrations at 110 and 120 ppm or STEVIA EXTRACT (PCS-1015) with concentrations of 70 and 90 ppm. Other ingredients in the CSD samples were citric acid, lemon-lime flavor, sodium benzoate, potassium citrate and xanthan gum. The objective of the test was to determine the sweetness detection limit of STEVIA EXTRACT. Tests were conducted as outlined in Example 1A.

The samples with 120 ppm PCS-5001 (STEVIA EXTRACT) and 90 ppm PCS-1015 (STEVIA EXTRACT) showed no significant difference in sweetness than the 1.5% sugar control. The recognition threshold concentration of PCS-5001 (STEVIA EXTRACT) in a lemon-lime flavored carbonated soft drink water was determined to be 110 ppm. The recognition threshold concentration of PCS-1015 (STEVIA EXTRACT) in a lemon-lime flavored carbonated soft drink water was determined to be 70 ppm. Results are shown in table 5.

TABLE 5

Sweetness perception of *STEVIA* EXTRACT in different concentrations against 1.5% sugar solution in a typical carbonated soft drink (CSD)

| Sweetness perception of *STEVIA* EXTACT in CSD | CSD sample with Sugar sweeter? | CSD sample with *Stevia* Sweeter? | P-Value | Significance |
|---|---|---|---|---|
| PCS-5001: 110 ppm, N = 30 | 23 | 7 | 0.0052 | *** |
| PCS-5001: 120 ppm, N = 36 | 20 | 16 | 0.677 | NS |
| PCS-1015: 70 ppm, N = 30 | 21 | 9 | 0.0428 | *** |
| PCS-1015: 90 ppm, N = 30 | 12 | 18 | 0.3616 | NS |

Example 2: Effect of Stevia Extract on Flavor Modification in a Typical Carbonated Soft Drink Application A cola flavored carbonated soft drink was developed to evaluate the effect of PCS-5001 and PCS-1015 (stevia extract) on the sweetness and flavor profile of the beverage that was sweetened with sugar and stevia sweetener to achieve 30% sugar reduction (Table 6). The samples with and without PCS-5001 or PCS-1015 were evaluated by thirty consumer panel members, who assigned relative values to each sample for overall Liking, sweetness, vanilla flavor, brown note, and aftertaste on a 10-pt continuous intensity scale as outlined in Table 7.

TABLE 6

Cola flavored Soft drink for sensory evaluation

| COLA BEVERAGE FORMULA | Control: 30% Sugar Reduction | Test: 30% Sugar Reduction with PCS-5001 | Test: 30% Sugar Reduction with PCS-1015 |
|---|---|---|---|
| Water | 91.68 | 91.67 | 91.67 |
| Sugar | 7.89 | 7.89 | 7.89 |
| Cola Flavor - Flavor Systems | 0.375 | 0.375 | 0.375 |
| Phosphoric Acid 85% | 0.0333 | 0.0333 | 0.0333 |
| Caffeine | 0.0100 | 0.0100 | 0.0100 |
| Steviol glycoside | 0.0100 | 0.0100 | 0.0100 |
| PCS-5001 | | 0.0110 | |
| PCS-1015 | | | 0.0080 |
| Total | 100 | 100 | 100 |

TABLE 7

Sensory evaluation of Cola flavored carbonated soft drink

| | |
|---|---|
| Nature of Participants: | Company employees |
| Number of Sessions | 1 |
| Number of Participants: | 30 |
| Test Design: | Balanced, randomized within pair. Blind |
| Sensory Test Method: | Intensity and acceptance ratings |
| Environmental Condition | Standard booth lighting |
| Attributes and Scales: | Overall Acceptance on a 10-pt hedonic scale where 10 = Extremely Like and 0 = Extremely Dislike |

TABLE 7-continued

Sensory evaluation of Cola flavored carbonated soft drink

| | |
|---|---|
| Overall Liking, Sweetness, Vanilla flavor, Brown note, and Sweet Aftertaste. 10-pt continuous intensity scale where 0 = Imperceptible and 10 = Extremely Pronounced | |
| Statistical Analysis: | ANOVA (by Block) with Post Hoc Duncan's Test |
| Sample Size | ~1.5 oz. in a clear capped plastic cup |
| Serving Temperature | Refrigerated temperature (~45° F.) |
| Serving/Panelists Instruction: | Samples served simultaneously. Panelists instructed to read ingredient statement, evaluate each sample. |

FIG. 2 shows the modification of flavor and sweetness profiles caused by the addition of stevia extract (PCS-5001). The results indicated the sample containing stevia extract PCS-5001 and the sample containing PCS-1015 had significantly higher cola flavor, vanilla flavor, brown spice notes and overall liking compared to the control samples (at 95% confidence). The sample containing PCS-5001 had directionally lower bitterness, and bitter aftertaste intensity compared to the control samples (at 90% and 95% confidence respectively). The sample containing PCS-1015 had directionally lower bitterness, and sweet aftertaste intensity compared to the control samples (at 80% confidence). In addition, the sample with stevia extract (PCS-1015) had significantly lower bitter aftertaste compared to the control sample (at 95% confidence).

Example 3: Peach Flavored Tea Beverage for Sensory Evaluation

A peach flavored black tea drink was developed to evaluate the effect of STEVIA EXTRACT on the sweetness and flavor profile of the beverage that was sweetened with sugar and stevia sweetener to achieve 30% sugar reduction (Table 8). The samples with and without STEVIA EXTRACT were evaluated as outlined in EXAMPLE 2 by thirty consumer panel members, who assigned relative values to sweetness, bitterness, peach flavor, tea flavor, acid intensity, astringency, and aftertaste on 10-pt continuous intensity scale where 0=Imperceptible and 10=extremely pronounced.

TABLE 8

Peach Flavored Tea Beverage samples for sensory evaluation

| | Reduced Sugar Tea | Reduce Sugar Tea with PCS-5001 | Reduce Sugar Tea with PCS-1015 |
|---|---|---|---|
| Water | 95.71 | 95.70 | 95.71 |
| Sucrose | 3.850 | 3.850 | 3.850 |
| Black Tea Powder | 0.275 | 0.275 | 0.275 |
| Citric Acid | 0.0880 | 0.0880 | 0.0880 |
| Peach Flavor | 0.0330 | 0.0330 | 0.0330 |
| Sodium Citrate | 0.0150 | 0.0150 | 0.0150 |
| Potassium Sorbate | 0.0150 | 0.0150 | 0.0150 |
| Steviol Glycoside | 0.0140 | 0.0140 | 0.0140 |
| Stevia Extract PCS-5001 | | 0.0120 | |
| Stevia Extract PCS-1015 | | | 0.0080 |
| Xanthan Gum - TIC | 0.0013 | 0.0013 | 0.0013 |

Figure 3:
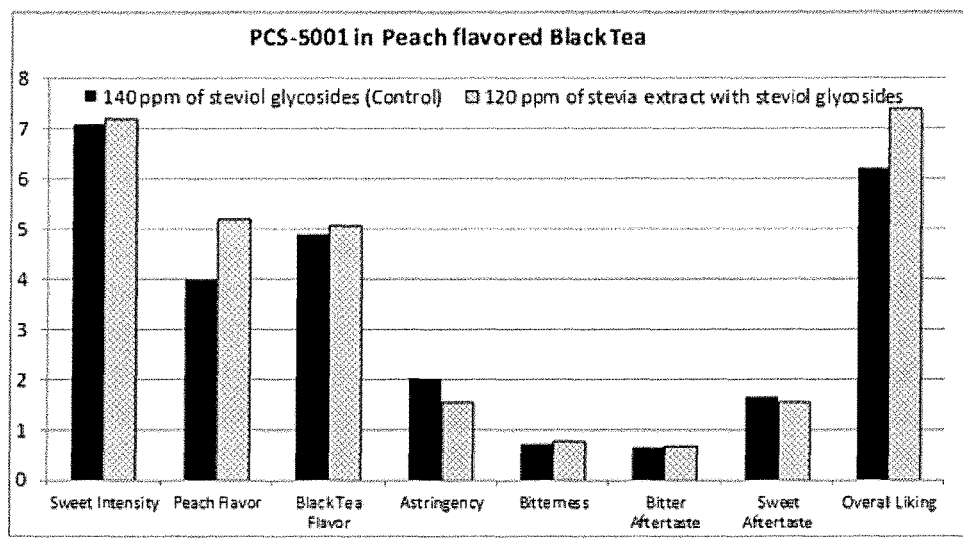
FIG. 3 is a bar graph showing the modification of flavor and sweetness profiles caused by the addition of stevia extract to an iced tea beverage.
Figure 4:
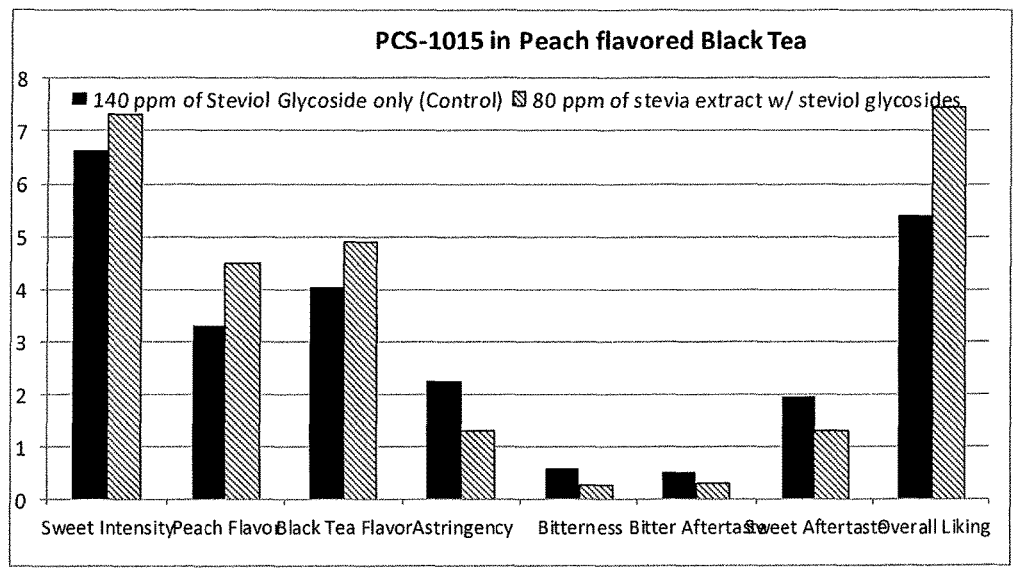
FIG. 4 is a bar graph showing the modification of flavor and sweetness profiles caused by the addition of stevia extract to an iced tea beverage.

FIG. 3 shows the modification of flavor and sweetness profiles contributed by the addition of STEVIA EXTRACT (PCS-5001) in peach flavored ice tea beverage. The results indicated that the test sample containing PCS-5001 had significantly higher peach flavor, and overall liking (at 95%, confidence). The sample containing PCS-5001 had significantly lower astringency than the control sample (at 95% confidence). The results shown in FIG. 4 indicated that the test sample containing PCS-1015 had significantly higher peach flavor, black tea flavor, and overall liking (at 95%, confidence). The sample PCS-1015 also had significantly lower astringency, sweet intensity, bitter intensity, and bitter aftertaste than the Control sample (at 95% confidence). In addition, the PCS-1015 sample had lower sweet aftertaste intensity than the Control sample at 90% confidence).

Example 4: Effect of Stevia Extract on Flavor Modification of Savory Applications A seasoning blend was developed to determine the flavor modification effect of stevia extract in a seasoning blend on reduced sugar roasted peanut samples. Thirty consumer panel members evaluated two samples of the peanuts for overall acceptance and attribute intensities (overall flavor, saltiness, sweetness, smoke flavor, spice/heat intensity, peanut flavor, chili powder flavor, bitterness and lingering sweet aftertaste intensity). The two samples (Table 9) included: 1) 50% sugar reduced control sample containing stevia glycosides, and 2) 50% reduced sugar test sample containing steviol glycoside and stevia extract, PCS-5001 or PCS-1015.

Figure 5:
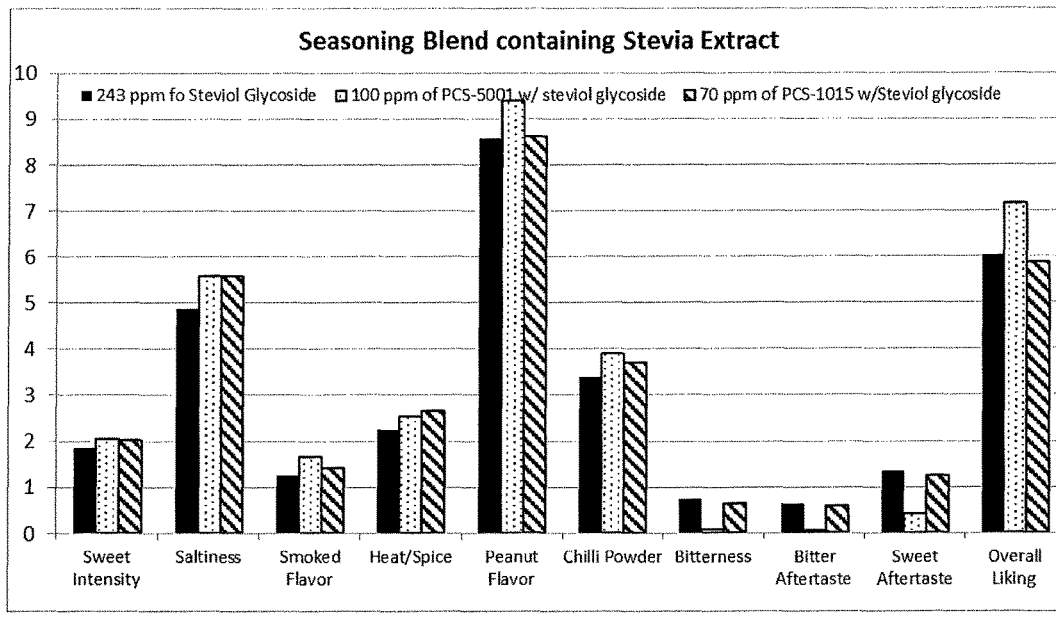
FIG. 5 is a bar graph showing the effect of stevia extract on the flavor profile of roasted peanuts.

The objective of the test was to determine if the addition of stevia extract affects the flavor profile of a savory snack food. The results indicated that the addition of PCS-5001 at 110 ppm and PCS-1015 at 70 ppm provided flavor modification (FIG. 5). The test samples containing 110 ppm PCS-5001 had significantly higher salt intensity, smoke flavor, and bitter intensity compared to the control (95% confidence). The test sample also had lower sweet intensity than the control (95% confidence). In addition, the test sample containing stevia extract had directionally higher spice and chili notes (90% confidence). The test sample containing PCS-1015 had significantly higher salt intensity than the control sample (at 95% confidence). The test sample showed an increase in heat/spice intensity, and chili flavor compared to the control.

TABLE 9

Effect of STEVIA EXTRACT on snack and seasoning applications

| | Steviol Glycoside | Steviol Glycoside + Stevia Extract | Steviol Glycoside + Stevia Extract |
|---|---|---|---|
| Unsalted Peanuts | 86.8 | 86.8 | 86.8 |
| Vegetable oil | 2.93 | 2.93 | 2.93 |
| Sugar | 5.88 | 5.88 | 5.88 |
| Salt | 2.93 | 2.93 | 2.93 |
| Chilli powder | 0.174 | 0.174 | 0.174 |
| Cumin powder | 0.286 | 0.286 | 0.286 |
| Garlic powder | 0.156 | 0.156 | 0.156 |
| Cayenne pepper | 0.156 | 0.156 | 0.156 |
| Smoke liquid | 0.729 | 0.729 | 0.729 |
| Steviol Glycoside | 0.0243 | 0.0243 | 0.0243 |
| PCS-5001 | | 0.0110 | |
| PCS-1015 | | | 0.0070 |
| Total wt. (g) | 100 | 100 | 100 |

TABLE 10

Sensory evaluation of snack and seasoning applications

| | |
|---|---|
| Nature of Participants: | Company employees |
| Number of Sessions | 1 |
| Number of Participants: | 30 |

TABLE 10-continued

Sensory evaluation of snack and seasoning applications

| Test Design: | Balanced, randomized within pair. Blind |
|---|---|
| Sensory Test Method: | Intensity and acceptance ratings |
| Environmental Condition | Standard booth lighting |
| Attributes and Scales: | |
| Overall Acceptance on a 9-pt hedonic scale where 9 = Like Extremely, 5 = Neither Like Nor Dislike, and 1 = Dislike Extremely | |
| Overall Flavor, Saltiness, Sweetness, Smoke Intensity, Heat/spice intensity, peanut flavor, chili powder and Aftertaste Intensity (sweet and bitter) on a 10-pt continuous intensity scale where 0 = Imperceptible and 10 = Extremely Pronounced | |
| Open Ended General Comments | |
| Statistical Analysis: | ANOVA (by Block) with Post Hoc Duncan's Test |
| Sample Size | ~1.5 oz. in a clear capped plastic cup |
| Serving Temperature | Room temperature (~70° F.) |
| Serving/Panelists | Samples served simultaneously. |
| Instruction: | Panelists evaluate each sample once. |

Example 5: Flavor Modification of Sauce and Vegetable Preparation

A tomato ketchup preparation was developed to determine the flavor modification effect of stevia extract (PCS-1015). A panel of thirty company employees evaluated the overall acceptance and attribute intensities (tomato, onion, vinegar, sweet, saltiness, bitterness and aftertaste) of each sample. The sensory evaluation methodology outlined in Example 4 was adopted for the sauce samples as presented in Table 11.

TABLE 11

Effect of PCS-1015 (stevia extract) on tomato ketchup

| | Steviol Glycoside | Steviol Glycoside w/Stevia Extract |
|---|---|---|
| Tomato Juice (Sieved) | 52.4863 | 52.4793 |
| Tomato Puree | 24.6236 | 24.6236 |
| White Distilled Vinegar | 11.3454 | 11.3454 |
| Water | 1.5845 | 1.5845 |
| Sucrose | 2.6511 | 2.6511 |
| Tomato Paste | 5.8311 | 5.8311 |
| Onion Powder | 0.8649 | 0.8649 |
| Salt | 0.5811 | 0.5811 |
| Steviol glycoside | 0.032 | 0.032 |
| Stevia Extract (PCS 1015) | | 0.007 |
| Total | 100 | 100 |

Figure 6:
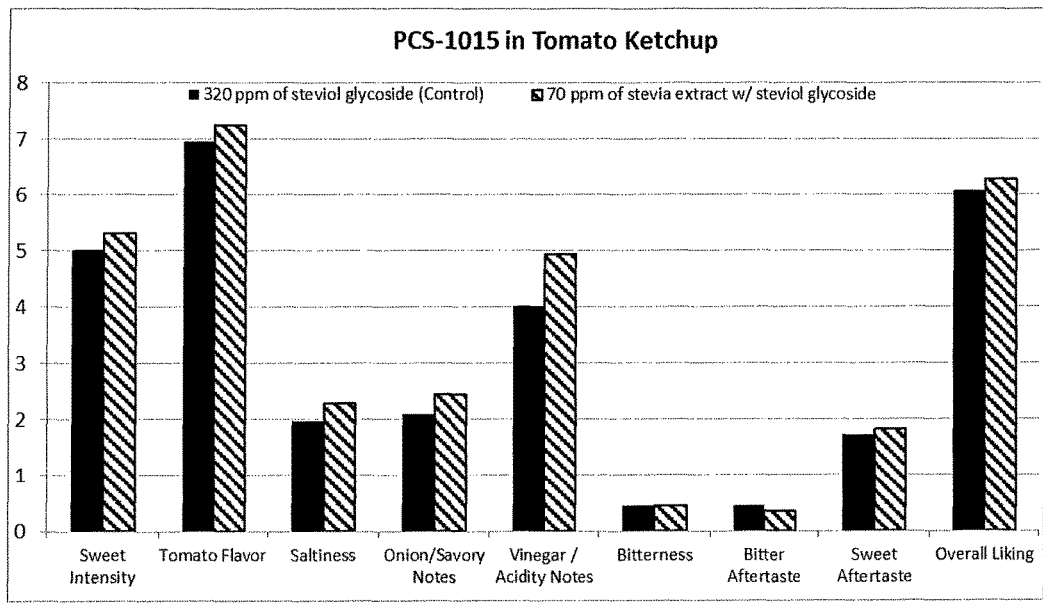
FIG. 6 is a bar graph showing the modification of flavor and sweetness profiles caused by the addition of stevia extract to tomato ketchup.

FIG. 6 shows the modification of flavor and sweetness profiles caused by the addition of stevia extract (PCS-1015). The results indicate the test samples containing stevia extract, PCS-1015, had a significant increase in herbal notes, and savory (onion/garlic) notes at a 95% confidence interval. The test sample containing PCS-1015 had directionally lower bitterness, bitter aftertaste and overall liking at a 90% confidence interval compared to the control sample.

Example 6: Effect of PCS-1015 (Stevia Extract) on Flavor Modification of Dairy Applications A chocolate flavored dairy beverage was developed to determine the flavor modification effect of stevia extract (PCS-1015) in dairy beverage. The panel evaluated samples of chocolate milk for overall acceptance and attribute intensities (chocolate flavor, dairy notes, sweetness, bitterness and aftertaste). The two samples (Table 12) included: 1) 50% sugar reduced control sample containing stevia glycosides, and 2) 50% reduced sugar test sample containing stevia glycoside and 80 ppm of stevia extract, PCS-1015.

TABLE 12

Effect of PCS-1015 (stevia extract) on flavored dairy beverage

| Dairy Formula | 50% Total Sugar Reduction with steviol glycoside | 50% Total Sugar Reduction with stevia extract and stevia glycoside |
|---|---|---|
| 2% Reduced fat Milk | 96.5803 | 96.5753 |
| Sugar | 2.40 | 2.40 |
| Cocoa Powder | 0.80 | 0.80 |
| Palsgaard 150 ChoMilk | 0.20 | 0.20 |
| Steviol Glycosides | 0.0197 | 0.0197 |
| PCS-1015 | | 0.080 |
| Total | 100 | 100 |

TABLE 13

Sensory evaluation of Dairy beverage

| Nature of Participants: | Company employees |
|---|---|
| Number of Sessions | 1 |
| Number of Participants: | 30 |
| Test Design: | Balanced, randomized within pair. Blind |
| Sensory Test Method: | Intensity and acceptance ratings |
| Environmental Condition | Standard booth lighting |
| Attributes and Scales: | |
| Overall Acceptance on a 10-pt hedonic scale where 10 = Extremely Like and 0 = Extremely Dislike | |
| Overall Liking, sweetness, bitterness, dairy notes, chocolate, and Aftertaste. 10-pt continuous intensity scale where 0 = Imperceptible and 10 = Extremely Pronounced | |
| Statistical Analysis: | ANOVA (by Block) with Post Hoc Duncan's Test |
| Sample Size | ~1.5 oz. in a clear capped plastic cup |
| Serving Temperature | Refrigerated temperature (~45° F.) |
| Serving/Panelists Instruction: | Samples served simultaneously. Panelists instructed to read ingredient statement, evaluate each sample. |

Figure 7:
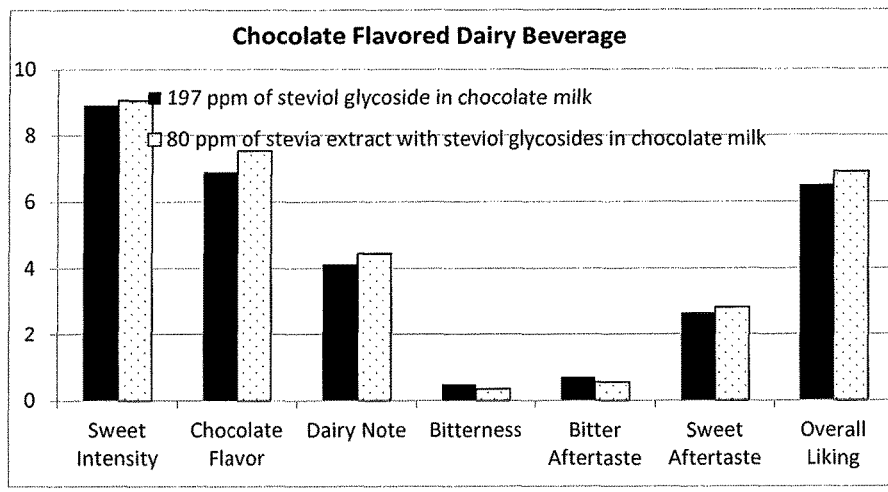
FIG. 7 is a bar graph showing the modification of flavor and sweetness profiles caused by the addition of stevia extract to chocolate milk.

FIG. 7 shows the modification of flavor and sweetness profiles caused by the addition of stevia extract (PCS-1015). The results indicate the 50% sugar reduced sample containing steviol glycoside sweetener and stevia extract, PCS-1015, had significantly higher chocolate flavor.

Example 7: Effect of Stevia Extract (PCS-5001) on Flavor Modification of Baked Goods Applications A lemon poppy seed flavored muffin formulation was developed to determine the flavor modification effect of stevia extract (PCS-5001) in baked good applications. To test the contribution of PCS-5001 in baked goods, lemon flavored poppy seed muffins were baked with a 45% sugar reduced formulation with steviol glycoside as control, and sugar reduced formulation with steviol glycoside and stevia extract (PCS-5001) as a test sample as shown in Table 14. A thirty member consumer panel evaluated two samples of lemon poppy seed muffins for several attributes (lemon, vanilla flavors, brown notes, sweet & bitter aftertaste).

TABLE 14

Effect of PCS-5001 (*stevia* extract) on baked goods

| Ingredients | Steviol Glycoside (400 ppm) Control | Steviol glycoside w/120 ppm *stevia* extract |
|---|---|---|
| DRY Ingredients | | |
| Sucrose | 12.3722 | 12.3682 |
| All Purpose Flour | 17.6434 | 17.6434 |
| Whole Wheat Flour | 5.8763 | 5.8763 |
| Poppy Seeds | 1.0648 | 1.0648 |
| Maltodextrin - 10DE | 2.1368 | 2.1368 |
| Fibersol2 (ADM/Matsutani) | 1.0648 | 1.0648 |
| Modified Starch - Inscosity 656 | 1.0648 | 1.0648 |
| Lemon Flavor - Firmenich | 0.8860 | 0.8860 |
| Salt (Sodium Chloride) | 0.7479 | 0.7479 |
| Baking Powder | 1.0648 | 1.0648 |
| Baking Soda | 0.3205 | 0.3205 |
| Steviol Glycoside | 0.0400 | 0.0400 |
| *Stevia* extract (PCS-5001) | | 0.0120 |
| Wet Ingredients | | |
| Milk, 2% | 27.2444 | 27.2444 |
| Soybean Oil | 11.7525 | 11.7525 |
| Whole Eggs | 8.5473 | 8.5473 |
| Water | 5.3420 | 5.3420 |
| Yogurt, Plain Nonfat | 1.6026 | 1.6026 |
| Lemon Juice, 100% | 0.6410 | 0.6410 |
| Vanilla Extract | 0.5342 | 0.5342 |
| | 100 | 100 |

Figure 8:
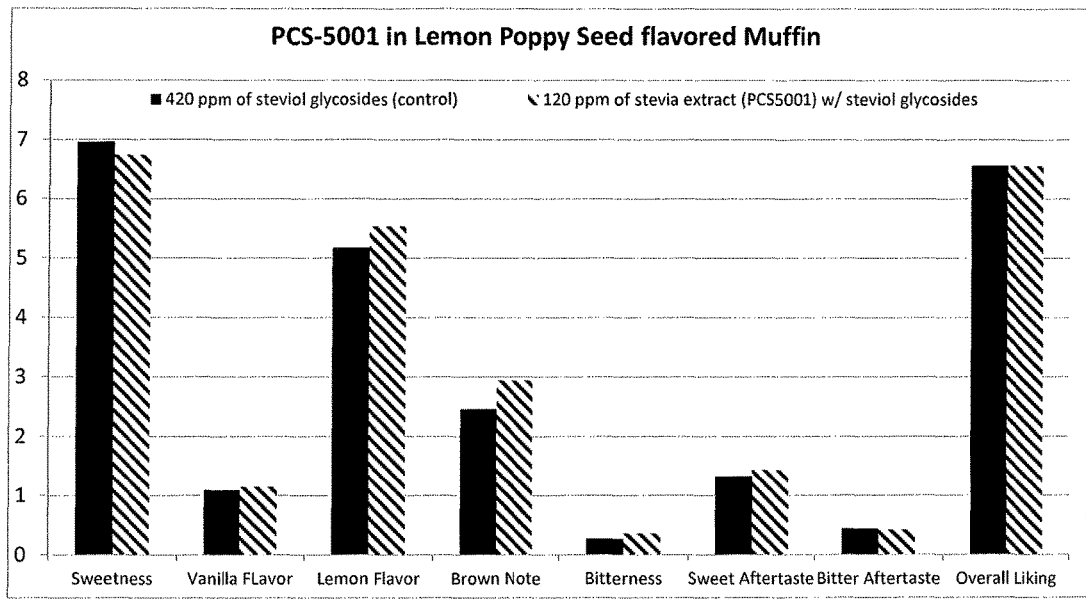
FIG. 8 is a bar graph showing the modification of flavor and sweetness profiles caused by the addition of stevia extract to poppy seed muffins.

FIG. 8 shows the modification of flavor and sweetness profiles caused by the addition of stevia extract (PCS-5001). The panel found that the addition of stevia extract provided an increase in brown note than control sample without stevia extract (at 90% confidence).

Example 8: Effect of Stevia Extract (PCS-5001) on Flavor Modification of Reduced Sodium Applications A 30% salt reduced tortilla chip formulation was developed to determine the flavor modification effect of stevia extract (PCS-5001) in a salt reduced applications. To test the contribution of PCS-5001 in a salt reduced application, cheddar cheese flavor tortilla chips were coated with a control salt formulation, and a 30% salt reduced formulation with stevia extract (PCS-5001) as a test sample as shown in Table 15. A sixteen member consumer panel evaluated two samples of cheddar cheese flavored tortilla chips for different attributes (sweet intensity, saltiness, cheese flavor, dairy notes, corn flavor, bitterness, and sweet & bitter aftertaste).

Figure 9:
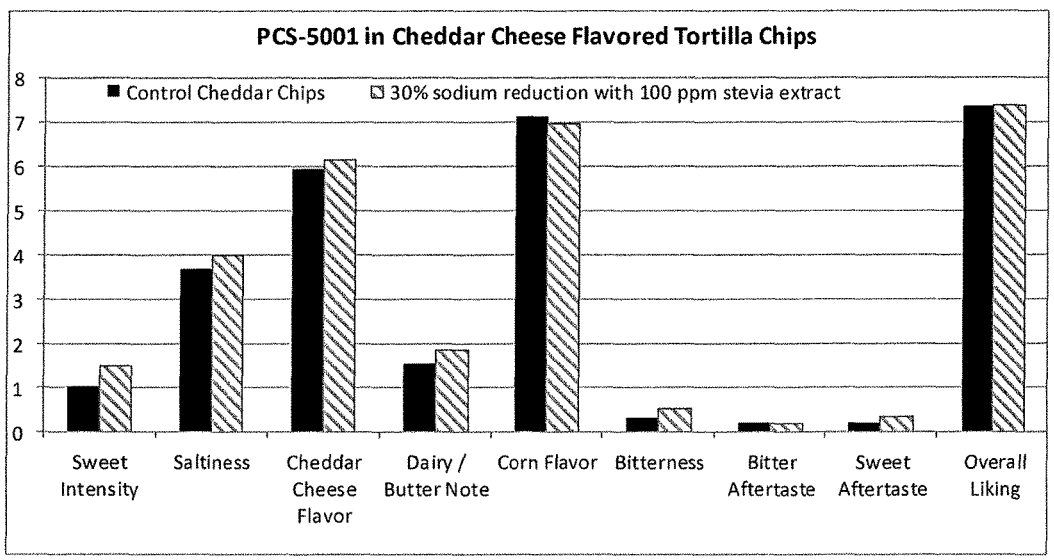
FIG. 9 is a bar graph showing the modification of flavor and sweetness profiles caused by the addition of stevia extract to tortilla chips.

FIG. 9 shows the modification of flavor and salt perception caused by the addition of stevia extract (PCS-5001). The panel found the addition of stevia extract in a 30% salt reduced formulation provided an increase in salt perception, parity to the full sodium control. In addition, stevia extract provided an increase in sweet intensity and dairy note higher than control sample without stevia extract (at 95% confidence).

TABLE 15

Tortilla Chips with Cheddar Cheese 30% less sodium

| | Control | 30% Less Salt |
|---|---|---|
| Corn chips | 78 | 78.33 |
| Cheese seasoning | 10 | 10.04 |

TABLE 15-continued

Tortilla Chips with Cheddar Cheese 30% less sodium

| | Control | 30% Less Salt |
|---|---|---|
| Vegetable Oil | 11 | 11.05 |
| Added Salt | 1 | 0.57 |
| PCS-5001 | | 0.01 |
| Total w (g) | 100 | 100.00 |

Example 9: Effect of Stevia Extract (PCS-5001) on Flavor Modification of Dried Meat Applications A beef jerky formulation was developed to determine the flavor modification effect of stevia extract (PCS-5001) in a dried meat applications. To test the contribution of PCS-5001 in a dried meat application, flank steak was marinated with a reduced sugar control formulation, and a 30% sugar reduced formulation with steviol glycosides and stevia extract (PCS-5001) as a test sample as shown in Table 16. A twenty member consumer panel evaluated two samples of beef jerky for different attributes (sweet intensity, saltiness, black pepper, teriyaki flavor, fat-like intensity, beef flavor and sweet aftertaste).

Figure 10:
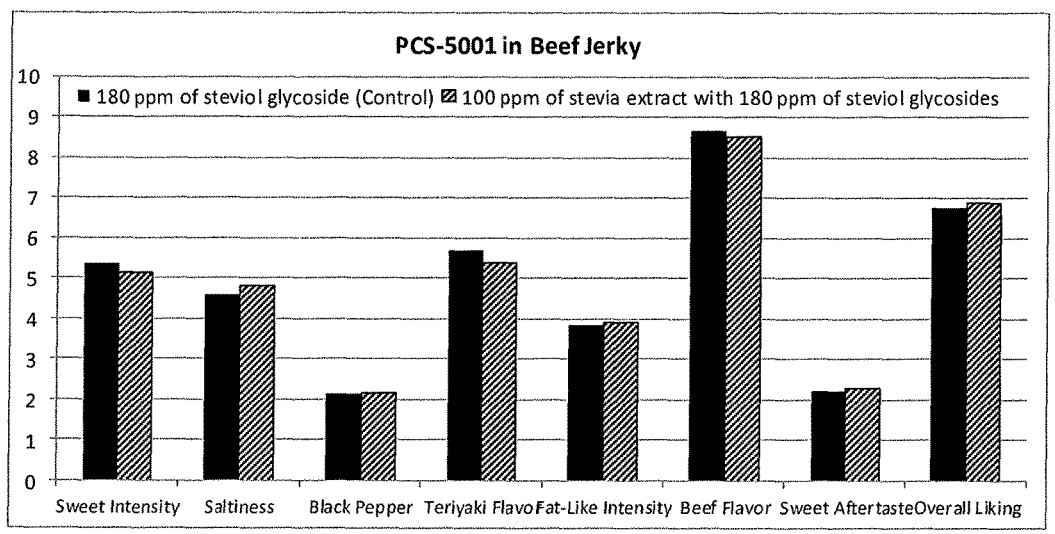
FIG. 10 is a bar graph showing the modification of flavor and sweetness profiles caused by the addition of stevia extract to beef jerky.

FIG. 10 shows the modification of flavor and salt perception caused by the addition of stevia extract (PCS-5001). The panel found the addition of stevia extract in a 30% sugar reduced formulation provided an increase in salt perception.

TABLE 16

30% sugar reduced Beef Jerky

| | Control (%) | *Stevia* Extract |
|---|---|---|
| Flank Steak | 75.44 | 75.44 |
| Balsamic vinegar | 10.15 | 10.15 |
| Salt | 2.46 | 2.46 |
| Pepper | 0.83 | 0.83 |
| Sugar | 6.88 | 6.88 |
| Liquid smoke | 0.86 | 0.86 |
| Water | | |
| Garlic powder | 0.44 | 0.44 |
| Onion powder | 0.44 | 0.44 |
| Steviol Glycoside | 0.018 | 0.018 |
| PCS-5001 (*stevia* extract) | | 0.0100 |
| Worcestershire sauce | 2.46 | 2.46 |
| | 100 | 100 |

Example 10: Effect of Stevia Extract (PCS-5001) on Flavor Modification of Reduced Sodium Applications in Brown Gravy A 30% sodium reduced brown gravy formulation was developed to determine the flavor modification effect of stevia extract (PCS-5001) in a salt reduced applications. To test the contribution of PCS-5001 in a salt reduced application, a 30% sodium reduced brown gravy formulation, and a 30% salt reduced formulation with stevia extract (PCS-5001) as a test sample. A thirty member consumer panel evaluated two samples of brown gravy for different attributes (sweet intensity, saltiness, black pepper, beef flavor, and onion/savory notes, bitterness, and sweet & bitter aftertaste).

Figure 11:
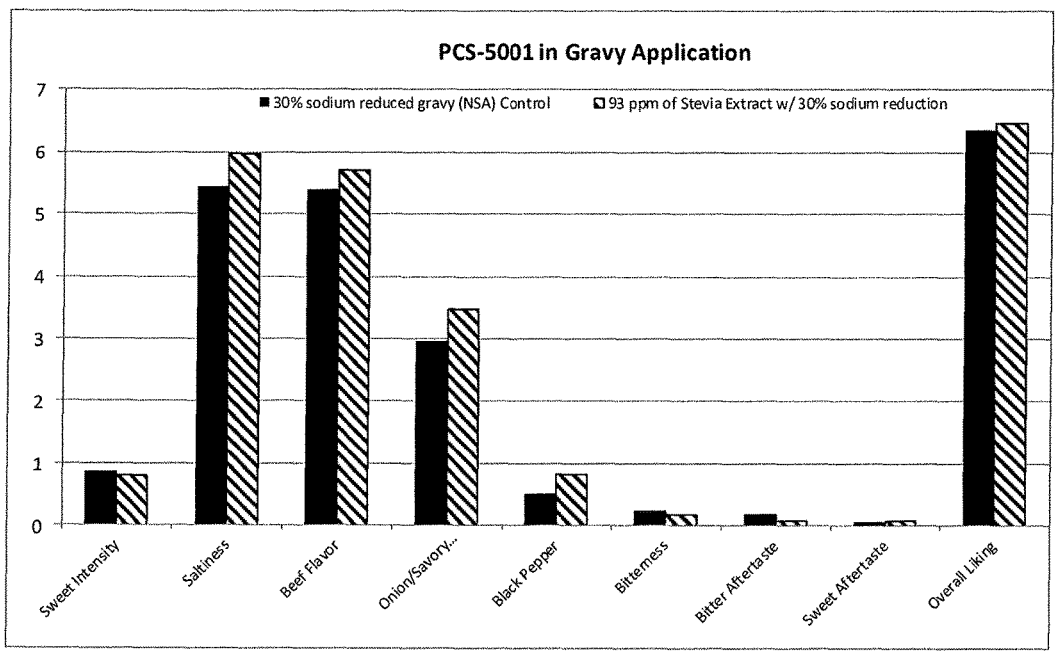
FIG. 11 is a bar graph showing the modification of flavor and sweetness profiles caused by the addition of stevia extract to brown gravy.

FIG. 11 shows the modification of flavor and salt perception caused by the addition of stevia extract (PCS-5001). The panel found the addition of stevia extract in a 30% salt reduced formulation provided an increase in salt perception compared to 30% sodium reduced control. In addition, stevia extract provided an increase in savory and black pepper note higher than control sample without stevia extract (at 95% confidence). There was also a decrease in bitter aftertaste.

Example 11: Effect of Stevia Extract on Flavor Modification of Dairy Product To evaluate the contribution of PCS-1015 (MLD-1), a stevia extract, to a dairy product, two 50% reduced sugar chocolate milk samples were prepared and tested by a consumer panel of 30 company employees. The consumer panel evaluated those two samples of chocolate milk for overall acceptance and attribute intensities (chocolate flavor, dairy notes, sweetness, bitterness and aftertaste) in two sessions. In session one, the two samples included: 1) a 50% sugar reduced control sample containing PureCircle Alpha (steviol glycoside sweetener) and 2) 50% sugar reduced test sample containing PureCircle Alpha and 70 ppm PCS-1015 (MLD-1). In session two, the two samples included: 1) a 50% sugar reduced control sample containing PureCircle Alpha (steviol glycoside sweetener) and 2) 50% sugar reduced test sample containing PureCircle Alpha and 80 ppm PCS-1015 (MLD-1). Tables 17 shows the formula of the control and test samples of 50% reduced sugar.

TABLE 17

50% sugar reduced Chocolate Milk with PCS-1015

| Dairy Formula | 50% Total Sugar Reduction with PureCircle Alpha | 50% Total Sugar Reduction with PC Alpha & PCS-1015 | 50% Total Sugar Reduction with PC Alpha & PCS-1015 |
|---|---|---|---|
| 2% Reduced fat Milk | 96.5803 | 96.5743 | 96.5753 |
| Sugar | 2.40 | 2.40 | 2.40 |
| Cocoa Powder 10/12 | 0.80 | 0.80 | 0.80 |
| Palsgaard 150 ChoMilk | 0.20 | 0.20 | 0.20 |
| PureCircle Alpha | 0.0197 | 0.0197 | 0.0197 |
| PCS-1015 (MLD-1) | | 0.0070 | 0.0080 |
| Total | 100 | 100 | 100 |

Figure 12:
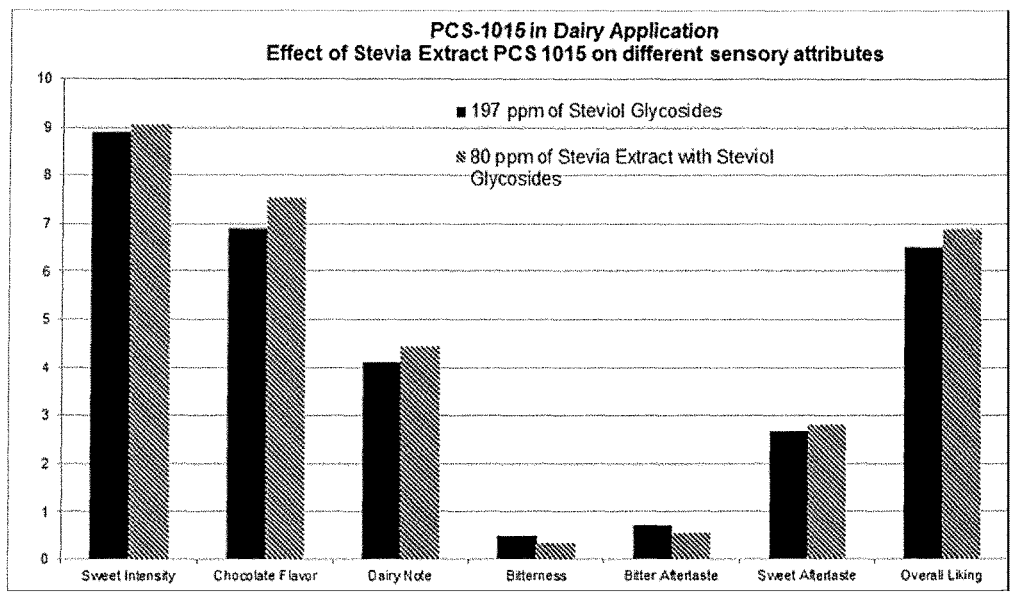
FIG. 12 is a bar graph showing the modification of flavor and sweetness profiles caused by the addition of stevia extract to chocolate milk.

Table 18 shows the sensory results with the two test samples. Both test samples showed the impact of the stevia extract (PCS 1015) on the Chocolate flavor notes and dairy note. At 80 ppm use level, the chocolate milk sample showed better sweetness profile and overall liking than the control sample. FIG. 12 shows the comparison of the taste profile between the control and the test sample with 80 ppm stevia extract PCS 1015.

TABLE 18

Summary of the overall acceptance and mean attribute intensity results for each reduced sugar chocolate milk samples tested by 30 panel members.

Summary of Mean-Scores, P-Values, and Significance Test Result Code - chocolate milk with 70 ppm MLD-1

| Attribute | 197 ppm of Alpha Only (Control) | 70 ppm of MLD-1 w/ PC Alpha | P-Value | Sig |
|---|---|---|---|---|
| Sweet Intensity | 8.85 | 8.89 | 0.8555 | NS |
| Chocolate Flavor | 6.82 b | 7.70 a | 0.0482 | *** |
| Dairy Note | 3.61 b | 4.19 a | 0.1934 | * |
| Bitterness | 0.84 | 0.83 | 0.9500 | NS |
| Bitter Aftertaste | 0.74 | 0.70 | 0.6096 | NS |
| Sweet Aftertaste | 3.02 | 3.15 | 0.7232 | NS |
| Overall Liking | 7.12 | 7.42 | 0.5114 | NS |

Summary of Mean-Scores, P-Values, and Significance Test Result Code - chocolate milk with 80 ppm MLD1

| Attribute | 197 ppm of Alpha Only (Control) | 80 ppm of MLD-1 w/ PC Alpha | P-Value | Sig |
|---|---|---|---|---|
| Sweet Intensity | 8.90 b | 9.05 a | 0.1557 | * |
| Chocolate Flavor | 6.89 b | 7.53 a | 0.0048 | *** |
| Dairy Note | 4.12 b | 4.44 a | 0.1470 | * |
| Bitterness | 0.49 | 0.35 | 0.2473 | NS |
| Bitter Aftertaste | 0.71 a | 0.55 b | 0.1824 | * |
| Sweet Aftertaste | 2.66 | 2.82 | 0.5177 | NS |
| Overall Liking | 6.49 b | 6.89 a | 0.1908 | * |

\* = 80% CI,
\*\* = 90% CI,
\*\*\* = 95% CI

Example 12: Effect of Stevia Extract on Desserts (Vanilla Custard)

To test the contribution of the stevia extract, PCS-1015 in gelatin and puddings, two 30% calorie reduced vanilla custard samples were tested: 1) sweetened with PureCircle Alpha, a PureCircle stevia sweetener, 2) sweetened with PureCircle Alpha and PCS-1015 (MLD-1). Table 19 shows the formulation of the control and test samples. A panel of 30 trained panelists with extensive experience in profiling sensory attributes tasted both samples.

To prepare the sample, blend the PureCircle Alpha and the test ingredient (PCS-1015) with the dry ingredients. Add the dry ingredients to the milk using good agitation. Heat on low until all ingredients are dissolved. Heat up to 95° C. for 10 minutes to cook up the starches. Add flavors, stir it, cool, stir it before place it in the refrigerator. Serve at chilled in 1 oz cups.

TABLE 19

Reduced sugar dessert (Vanilla Custard) with PCS-1015

| | Control with PureCircle Alpha | Test with PureCircle Alpha w/ stevia extract |
|---|---|---|
| Milk (1% fat) | 94.27 | 94.27 |
| Sucrose | 4.00 | 4.00 |
| Starch Perma Flo Tate & Lyle | 1.25 | 1.25 |
| TIC Carrageenan | 0.09 | 0.09 |
| Salt | 0.06 | 0.06 |
| ROHA Beta Carotene | 0.05 | 0.05 |
| French Vanilla Flavor UV 420-066-7 | 0.15 | 0.15 |
| Steviol Glycoside | 0.0166 | 0.0166 |
| Stevia Extract | — | 0.0080 |
| Total | 100 | 100 |

Figure 13:
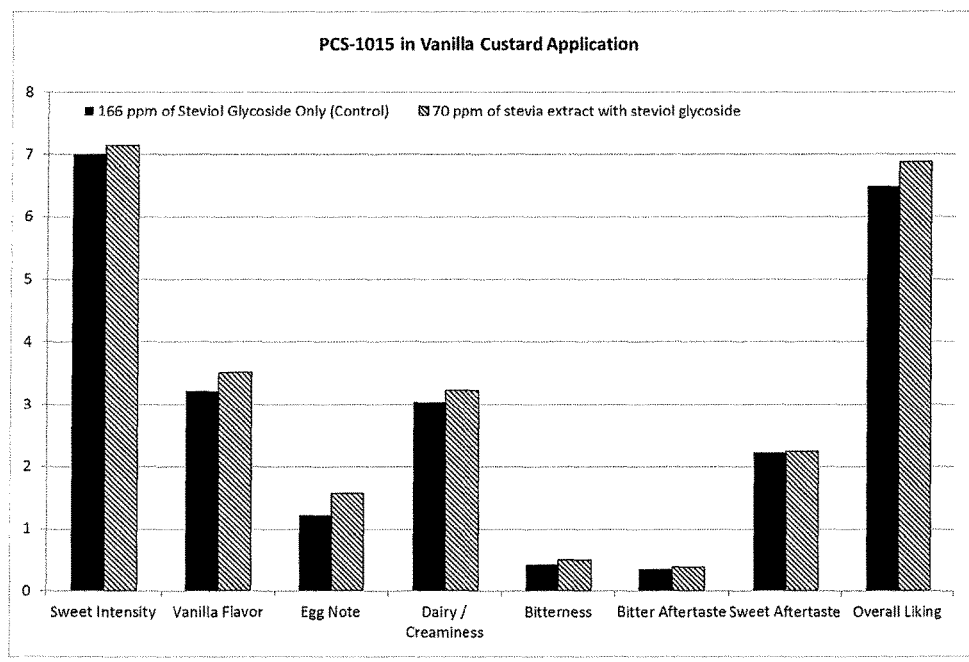
FIG. 13 is a bar graph showing the modification of flavor and sweetness profiles caused by the addition of stevia extract to vanilla custard.

The trained panel found that the test sample had stronger sweet intensity, vanilla, dairy flavor notes and overall liking at 80% confidence. The sample containing stevia extract also had significantly higher egg note at 95% confidence. FIG. 13 shows the pictorial rendition of the sensory difference between the control and test dessert samples

TABLE 20

Summary of the overall acceptance and mean attribute intensity results for reduced sugar dessert (Vanilla Custard) with PCS-1015

| Attribute | 166 ppm of Alpha Only (Control) | 70 ppm of MLD-1 with Alpha | P-Value | Sig |
|---|---|---|---|---|
| Sweet Intensity | 7.01 a | 7.13 b | 0.1095 | * |
| Vanilla Flavor | 3.22 a | 3.5 b | 0.1299 | * |
| Egg Note | 1.22 a | 1.56 b | 0.0497 | *** |
| Dairy/Creaminess | 3.04 a | 3.22 b | 0.1164 | * |
| Bitterness | 0.43 | 0.5 | 0.3001 | NS |
| Bitter Aftertaste | 0.36 | 0.38 | 0.7692 | NS |
| Sweet Aftertaste | 2.23 | 2.24 | 0.8794 | NS |
| Overall Liking | 6.49 a | 6.87 b | 0.1149 | * |

Example 13: Effect of Stevia Extract on Flavor Modification of Chocolate-Flavored Beverage with Cocoa Powder Reduction A chocolate flavored dairy beverage was developed to determine the flavor modification effect of stevia extract flavor with modifying properties (FMP) in a dairy beverage. The two samples included: 1) control sample with full amounts of sugar and cocoa powder, and 2) test sample with 15% reduced sugar and 20% reduced cocoa, containing 60 ppm of stevia extract FMP, as shown in Table 21.

TABLE 21

Reduced Sugar and Cocoa Chocolate-Flavored Beverage (Chocolate Milk) with Stevia Extract

|  | Control with Full Amount of Sugar and Cocoa | Test with Reduced Sugar and Cocoa with Stevia Extract |
|---|---|---|
| Milk, 2% milkfat | 85.200 | 86.554 |
| Sugar | 8.00 | 6.80 |
| Hot Water, 190 F. | 6 | 6 |
| Natural 10/12 Cocoa Powder | 0.80 | 0.64 |
| Stevia Extract FMP (PSB-5005) | — | 0.006 |
| Total | 100 | 100 |

A 15 member trained panel evaluated samples of chocolate milk for overall acceptance and attribute intensities (sweet intensity, bitterness, cocoa flavor, dairy note, sweet aftertaste and bitter aftertaste). The parameters for the sensory evaluation are shown in Table 22.

Figure 14:
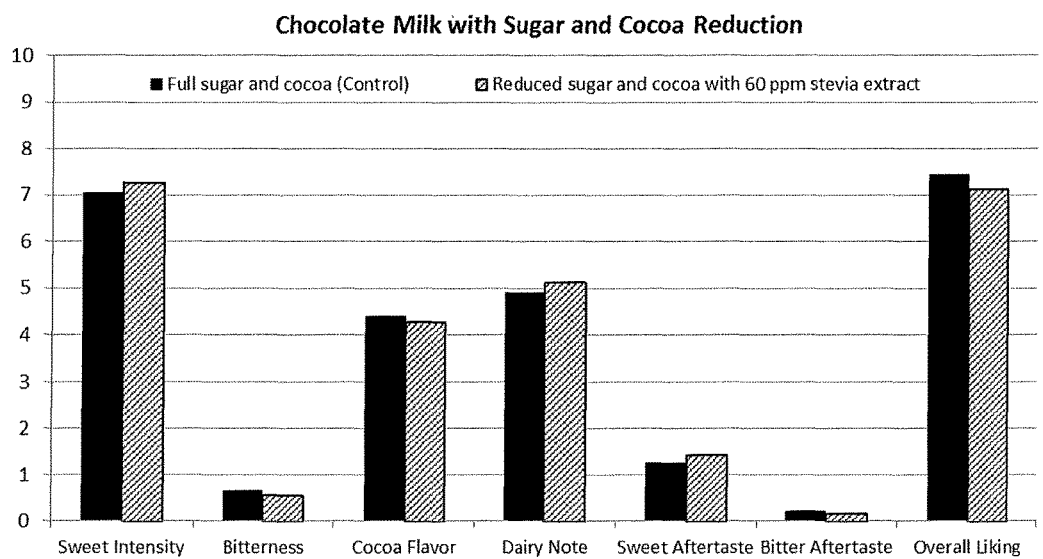
FIG. 14 is a bar graph showing the modification of flavor and sweetness profiles caused by the addition of stevia extract to chocolate milk.

Table 23 shows the sensory results for the control and test products. The test product with 20% reduced cocoa powder and stevia extract FMP shows no significant difference in cocoa flavor from the control. The test sample with 60 ppm stevia extract FMP was higher in sweet intensity (90% confidence) and sweet aftertaste (directional). FIG. 14 illustrates this comparison.

TABLE 22

Sensory evaluation of chocolate flavored beverage

| Nature of Participants: | Trained panel |
|---|---|
| Number of Sessions | 1 |
| Number of Participants: | 15 |
| Test Design: | Balanced, randomized within set. Blind |
| Sensory Test Method: | Intensity and acceptance ratings |
| Environmental Condition | Standard booth lighting |
| Attributes and Scales: | Overall Acceptance on a 10-pt hedonic scale where 10 = Extremely Like and 0 = Extremely Dislike Overall Liking, sweet intensity, bitterness, cocoa flavor, dairy note, sweet aftertaste and bitter aftertaste. 10-pt continuous intensity scale where 0 = Imperceptible and 10 = Extremely Pronounced |
| Statistical Analysis: | ANOVA (by Block) with Post Hoc Duncan's Test |
| Sample Size | ~1.5 oz. in a clear capped plastic cup |
| Serving Temperature | Refrigerated temperature (~45° F.) |
| Serving/Panelists Instruction: | Samples served simultaneously. Panelists instructed to evaluate each sample. |

TABLE 23

Sensory Results

| Attribute | Control with Full Amount of Sugar and Cocoa | Test with Reduced Sugar and Cocoa with Stevia Extract FMP |
|---|---|---|
| Sweet intensity | 7.05 | 7.26 |
| Bitterness | 0.65 | 0.55 |
| Cocoa flavor | 4.4 | 4.28 |
| Dairy note | 4.91 | 5.13 |
| Sweet aftertaste | 1.24 | 1.43 |
| Bitter aftertaste | 0.21 | 0.16 |
| Overall liking | 7.43 | 7.12 |

As seen in Table 23, the test product with reduced sugar and cocoa, and containing stevia extract FMP, in this case PSB-5005, had statistically similar overall liking and mean cocoa flavor intensity results as compared to a full-cocoa formulation. The test product containing stevia extract FMP had lower bitterness attribute and bitter aftertaste ratings compared to the control product made without stevia extract. The dairy note was rated higher in the test product compared to the control product. From these results it can be seen that a reduction in cocoa and sugar content in a dairy beverage can be suitably accomplished using a stevia extract FMP, such as PSB-5005, and unexpectedly with a decrease in bitterness which is typically associated with stevia ingredients.

Example 14: Effect of Stevia Extract FMP on Flavor Modification of Vanilla-Flavored Dairy Product A 50% sugar-reduced vanilla yogurt was developed to determine the flavor modification effect of stevia extract flavor with modifying properties (FMP) in a reduced-sugar vanilla-flavored dairy product. The two samples as shown in Table 24 included: 1) control sample with 180 ppm steviol glycoside sweetener, and 2) test sample with 180 ppm steviol glycoside sweetener and 100 ppm of stevia extract FMP.

TABLE 24

Sugar Reduced Vanilla-Flavored Dairy Product (Vanilla Yogurt)

| | Control 180 ppm steviol glycoside sweetener | Test with Reduced Sugar and Cocoa with Stevia Extract FMP |
|---|---|---|
| Plain nonfat yogurt | 96.132 | 96.122 |
| Sugar | 3.750 | 3.750 |
| Vanilla Flavor | 0.100 | 0.100 |
| Steviol Glycoside | 0.018 | 0.018 |
| Stevia Extract (PCS 5001) | — | 0.010 |
| Total | 100.000 | 100.000 |

A 30 member panel evaluated samples of vanilla yogurt for overall acceptance and attribute intensities (sweet intensity, bitterness, vanilla flavor, dairy, astringency, sweet aftertaste and bitter aftertaste). Table 25 lists the sensory evaluation parameters.

TABLE 25

Sensory evaluation of vanilla flavored dairy product

| | |
|---|---|
| Nature of Participants: | Trained sensory panel |
| Number of Sessions | 1 |
| Number of Participants: | 30 |
| Test Design: | Balanced, randomized within set. Blind |
| Sensory Test Method: | Intensity and acceptance ratings |
| Environmental Condition | Standard booth lighting |
| Attributes and Scales: | |
| Overall Acceptance on a 10-pt hedonic scale where 10 = Extremely Like and 0 = Extremely Dislike | |
| Overall Liking, sweet intensity, bitterness, vanilla flavor, dairy, astringency, sweet aftertaste and bitter aftertaste. 10-pt continuous intensity scale where 0 = Imperceptible and 10 = Extremely Pronounced | |
| Statistical Analysis: | ANOVA (by Block) with Post Hoc Duncan's Test |
| Sample Size | ~1.5 oz. in a clear capped plastic cup |
| Serving Temperature | Refrigerated temperature (~45° F.) |
| Serving/Panelists Instruction: | Samples served simultaneously. Panelists instructed to evaluate each sample. |

Figure 15:
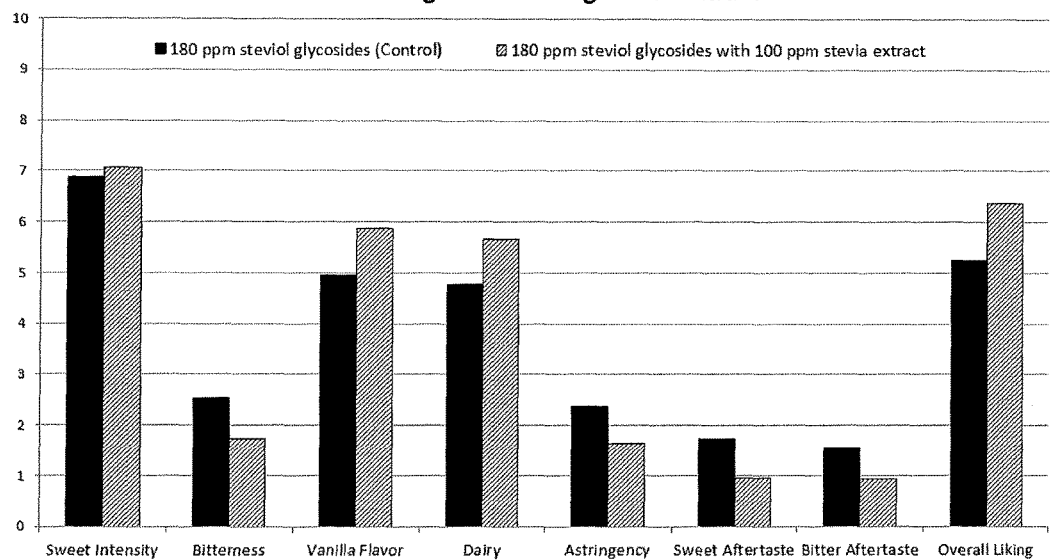
FIG. 15 is a bar graph showing the modification of flavor and sweetness profiles caused by the addition of stevia extract to vanilla yogurt.

Table 26 shows the sensory results for the control and test products. At 95% confidence, the test sample containing stevia extract FMP was significantly higher for sweet intensity and vanilla flavor and significantly and unexpectedly lower in bitterness, astringency and sweet aftertaste. At 90% confidence, the test sample was higher in dairy and had higher overall liking. FIG. 15 illustrates this comparison.

TABLE 26

Summary of the overall acceptance and mean attribute intensity results for vanilla-flavored dairy product (vanilla yogurt) with Stevia extract

| Attribute | Control 180 ppm steviol glycoside sweetener | Test with 180 ppm steviol glycoside sweetener and 100 ppm Stevia extract FMP | p-value | Sig |
|---|---|---|---|---|
| Sweet intensity | 6.88 | 7.05 | 0.0281 | *** |
| Bitterness | 2.53 | 1.74 | 0.0374 | *** |
| Vanilla flavor | 4.95 | 5.87 | 0.0452 | *** |
| Dairy | 4.78 | 5.65 | 0.0507 | ** |
| Astringency | 2.36 | 1.63 | 0.0407 | *** |
| Sweet aftertaste | 1.73 | 0.95 | 0.0144 | *** |
| Bitter aftertaste | 1.55 | 0.94 | 0.0682 | ** |
| Overall liking | 5.26 | 6.37 | 0.0629 | ** |

Example 15: Usage Levels of Stevia Extract FMP

Useful or maximum usage levels of stevia extract FMPs were evaluated. To be useful as a flavor with modifying properties, the level of use of the stevia extract must be below a certain sweetness detection threshold in a particular food or beverage product. To determine this threshold, a sensory evaluation is conducted with a full sugar product as the control, and a test product containing different levels of the stevia extract FMP. Sensory panel members are then asked to identify which product is sweeter.

Using the Flavor and Extract Manufacturers' Association (FEMA) guidance document called "Guidance for the Sensory Testing of Flavorings with Modifying Properties within the FEMA GRAS™ Program, 2013", the recognition threshold was determined using a 2-alternative forced choice (2-AFC) methodology, as described in Table 27.

TABLE 27

Sensory evaluation to determine usage levels

| | |
|---|---|
| Nature of Participants: | Company employees |
| Number of Sessions | 1 |
| Number of Participants: | 30 |
| Test Design: | 2- AFC, Balanced, randomized within pair. Blind |
| Sensory Test Method: | Intensity ratings |
| Environmental Condition | Standard booth lighting |
| Attributes and Scales: | Which sample is sweeter? |
| Statistical Analysis: | Paired comparison Test |
| Sample Size | ~1.5 oz. in a clear capped plastic cup |
| Serving Temperature | Refrigerated temperature (~42° F.) or room temperature, depending on sample requirements |
| Serving/Panelists Instruction: | Samples served simultaneously. Panelists instructed to read ingredient statement, evaluate each sample. |

Usage levels for stevia extract FMP are determined by those levels at which the stevia extract FMP provides a sweetness perception that is significantly less than the full sugar control. For products other than baked goods and breakfast cereals, the sugar level in the control product was 1.5%. In baked goods, the sugar level in the control product was 4%, and in breakfast cereals, the sugar level in the control product was 3%. The test products contained no added sugar and contain various levels of stevia extract FMP.

Table 28 shows usage levels of stevia extract FMP in various food and beverage applications as determined using the FEMA sensory testing guidance.

TABLE 28

| Usage levels of *stevia* extract FMP | |
|---|---|
| Category | Usage Level (ppm) |
| Baked Goods | 500 |
| Beverages, Non-Alcoholic | 110 |
| Beverages, Alcoholic | 130 |
| Breakfast Cereals | 600 |
| Chewing Gum | 100 |
| Condiments and Relishes | 100 |
| Confections and Frostings | 100 |
| Fats and Oils | 180 |
| Frozen Dairy | 100 |
| Fruit Ices | 100 |
| Gelatins and Puddings | 100 |
| Gravies | 100 |
| Hard Candy | 100 |
| Imitation Dairy | 165 |
| Instant Coffee and Tea | 200 |
| Jams and Jellies | 100 |
| Milk Products | 165 |
| Nut Products | 230 |
| Processed Fruits | 100 |
| Processed Vegetables | 100 |
| Seasonings and Flavors | 230 |
| Snack Foods | 230 |
| Soft Candy | 100 |
| Soups | 100 |
| Sugar Substitutes | 100 |
| Sweet Sauces | 100 |

It was unexpectedly discovered that stevia extract FMPs can be used at various levels to favorably impact the taste and flavor profile of a food or beverage product while having little or no detectable sweetness perception in that product. These usage levels serve as examples of use, and other usage levels of the stevia extract FMP in various consumable products are contemplated by this invention.

Although various embodiments of the present invention have been disclosed here for purposes of illustration, it should be understood that a variety of changes, modifications and substitutions may be incorporated without departing from either the spirit or the scope of the invention.

What is claimed is:

1. A method for modifying a flavor of a consumable product, comprising adding a stevia extract flavor with modifying properties (FMP) comprising:
   (a) rebaudioside A at a level of up to about 30% by weight;
   (b) stevioside at a level of up to about 12% by weight;
   (c) minor steviol glycosides; and
   (d) plant molecules comprising one or more selected from the group consisting of glucosyl-4'-O-apigenin; glucosyl-7-O-luteolin; rhamnosyl-3-O-kaempferol; glucosyl-3-O-quercitin; arabinosyl-3-O-quercetin; 5,7,3'-methoxyflavone, 3,6,4'-methoxyflavone, Centaureidin, and avicularin;

wherein the minor steviol glycosides and plant molecules are present at a level of up to 55% of the stevia extract FMP and the stevia extract FMP is added to the consumable product in an amount below a stevia extract FMP sweetness detection threshold level of about 110 ppm to modify the flavor and sweetness profile of the consumable product without imparting detectable sweetness to the consumable product.

2. The method of claim 1, wherein the stevia extract FMP is added to the consumable product in an amount of up to 100 ppm.

3. The method of claim 1, wherein the stevia extract FMP is added to the consumable product in an amount ranging from about 60 ppm to 100 ppm.

4. The method of claim 1, wherein the flavor of the consumable product is modified by reducing a bitterness of the consumable product as compared to a control product that does not contain the stevia extract FMP.

5. The method of claim 1, wherein the flavor of the consumable product is modified by reducing a bitter aftertaste of the consumable product as compared to a control product that does not contain the stevia extract FMP.

* * * * *